United States Patent
Wu et al.

(10) Patent No.: US 7,333,492 B2
(45) Date of Patent: Feb. 19, 2008

(54) FIREWALL PROXY SYSTEM AND METHOD

(75) Inventors: Jianmin Wu, San Jose, CA (US); Chen-Huei Chang, Cupertino, CA (US)

(73) Assignee: Innomedia Pte Ltd, Singapore (SG)

( * ) Notice: Subject to any disclaimer, the term of this patent is extended or adjusted under 35 U.S.C. 154(b) by 744 days.

(21) Appl. No.: 10/930,182

(22) Filed: Aug. 31, 2004

(65) Prior Publication Data
US 2006/0045068 A1 Mar. 2, 2006

(51) Int. Cl.
*H04L 12/56* (2006.01)
(52) U.S. Cl. .................................... 370/392; 370/401
(58) Field of Classification Search ................ None
See application file for complete search history.

(56) References Cited

U.S. PATENT DOCUMENTS

| | | | |
|---|---|---|---|
| 2003/0093563 A1* | 5/2003 | Young et al. | 709/245 |
| 2004/0034793 A1* | 2/2004 | Yuan | 713/200 |
| 2004/0158606 A1* | 8/2004 | Tsai | 709/203 |

* cited by examiner

*Primary Examiner*—Wing Chan
*Assistant Examiner*—Anthony Sol
(74) *Attorney, Agent, or Firm*—Timothy P OHagan

(57) ABSTRACT

A media gateway control protocol (MGCP) proxy server interfaces between a plurality of MGCP gateways and at least one MGCP call agent which may be coupled to a private network and served by a network address translation firewall. The proxy server comprises a private network interface for communicating over a private network with the call agent and a public network interface for communicating over the Internet. A translation module provides for receiving an MGCP message generated by a gateway and addressed to the public network interface. The MGCP message includes a message transaction ID assigned by the gateway and an endpoint ID identifying the gateway. The endpoint ID comprises a local endpoint name and a domain. The translation module translating the MGCP message to create a translated message by: i) substituting a unique transaction ID in place of the message transaction ID; and ii) substituting a private IP address assigned to a private network interface in place of the domain of the endpoint ID of the MGCP message. The translation module: i) provides the translated message to the private network interface for sending to the call agent; ii) writes each of the unique transaction ID and the message transaction ID to a record of a gateway request map; and iii) writes the public socket on which the message was received from the gateway to a record associated with the MGCP gateway in a registration map and updates an indication of a predetermined time window during which the public socket is valid to a time period following receipt of the MGCP message.

18 Claims, 24 Drawing Sheets

Figure 8

| Registration Table 60 | | | | | | | |
|---|---|---|---|---|---|---|---|
| MTA End Point ID 74 | | Public Socket 80 | | Proxy End Point ID 86 | | NAT Timer Value 92 | Status 94 |
| Pattern 76 | Domain 78 | IP Address 82 | Port # 84 | Pattern 88 | Domain 90 | | |
| | | | | | | | |
| | | | | | | | |
| | | | | | | | |

| Notified Entity Map 62 | | | | |
|---|---|---|---|---|
| MTA End Point ID 100 | | Notified Entity 106 | | |
| Pattern 102 | Domain 104 | Call Agent IP 108 | Port # 110 | |
| | | | | |
| | | | | |
| | | | | |

{ 98 }

| MTA Original Request Map 64 | | |
|---|---|---|
| Public Socket 114 | Message Transaction ID 120 | Unique MTAR Transaction ID 122 |
| IP Address 116 | Port # 118 | | |

| Proxy MTA Request Map 66 | | End Point ID 130 | |
|---|---|---|---|
| Unique MTAR Transaction ID 126 | MTA Request Transaction ID 128 | Pattern 132 | Domain 134 |

| Call Agent Original Request MAP 68 | | |
|---|---|---|
| CA Socket 138 | | Message Transaction ID 144 | Unique CAR Transaction ID 146 |
| IP Address 140 | Port # 142 | | |
| | | | |
| | | | |
| | | | |

| Proxy Call Agent Request Map 70 | | | | | | |
|---|---|---|---|---|---|---|
| Unique CAR Transaction ID 150 | CA Socket 152 | | MGCP Request 158 | Session ID 160 | Relay Server Resource 162 | |
| | IP Address 154 | Port # 156 | | | IP Address 184 | Port # 166 |
| | | | | | | |
| | | | | | | |
| | | | | | | |

| CCCM Connection Map 72 |||||  |
|---|---|---|---|---|---|
| End Point ID 170 || Session ID 176 | Connection ID 178 | Relay Server Resource 180 ||
| Pattern 172 | Domain 174 | | | IP Address 182 | Port 184 |
| | | | | RSR 31 ||
| | | | | | |
| | | | | | |

168 { (bracketing the three data rows)

(NAT Binding Module)

(RSIP - MTA)
(End Point Management)

(Restart - MTA)
(Transaction Request Processing)

(NTFY - MTA)

(DLCX - MTA)

(CA - Response to RSIP)

(CA - Response to NTFY or DLCX)

(CA - CRCX)

(CA - MDCX)

(CA - DLCX)

(CA - AUEP)

(MTA - Response)

(MTA - Response)

(MTA - Response)

(MTA - Response)

| MGCP Message 500 |
|---|
| UDP/IP Header 502<br>   Source Socket 506<br>   Destination Socket 508<br>   Other UDP/IP Headers 510 |
| MGCP Message Fields 504<br>   End Point ID 512<br>      Pattern 512a<br>      Domain Name 512b<br>   Transaction ID 514<br>   Response ACK Fields 516<br>      Transaction ID<br>      Transaction ID<br>   Notified Entity Parameter 518<br>   Second End Point ID 520<br>   Other Message Specific Fields 530 |

Figure 30

FIREWALL PROXY SYSTEM AND METHOD

TECHNICAL FIELD

The present invention relates to real time media communications in a packet switched data network and, more specifically, to establishing and maintaining real time media communication channels through a firewall.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

More recently, the copper wires, or trunk lines between switching stations have been replaced with fiber optic cables. A computing device digitizes the analog signals and formats the digitized data into frames such that multiple conversations can be transmitted simultaneously on the same fiber. At the receiving end, a computing device reforms the analog signals for transmission on copper wires. Twisted pair copper wires of the subscriber loop are still used to couple the telephone handset to the local switching station.

More recently yet, voice telephone service has been implemented over the Internet. Advances in the speed of Internet data transmissions and Internet bandwidth have made it possible for telephone conversations to be communicated using the Internet's packet switched architecture and the TCP/IP and UDP/IP protocols.

To promote the wide spread use of Internet telephony, the International Telecommunication Union (ITU) had developed the H.323 set of standards and the Internet Engineering Task Force (IETF) has developed the Session Initiation Protocol (SIP) and the Multi-Media Gateway Control Protocol (MGCP) for signaling and establishing a peer-to-peer Voice-over-Internet Protocol (VoIP) media session.

In an example of using a MGCP system, a MGCP gateway, commonly called a multi-media terminal adapter (MTA), emulates a PSTN central office switch for supporting operation of one or more PSTN telephony devices. The MTA detects such events as on hook, off hook, and DTMF signaling and generates applicable notify (NTFY) messages to inform a remote MGCP call agent of each event. The MTA also receives various messages from the MGCP call agent and, in response, generates applicable in-band signals (such as ring, caller ID, and call waiting) on the PSTN link to the PSTN telephony device.

To establish a peer-to-peer VoIP media session (e.g. a VoIP telephone call), the calling MTA initiates the session by sending applicable notify (NTFY) messages to an MGCP call agent which indicate the intended destination of the call. The MGCP call agent sends a sequence of create connection (CRCX) messages and modify connection (MDCX) messages to each of the calling MTA and the MGCP gateway supporting the destination device such that the two can begin exchanging real time protocol (RTP) media sessions over UDP/IP channels.

A problem associated with such Internet telephony systems is that network address translation (NAT) firewalls prevent the transmission of UDP/IP frames from an endpoint outside the firewall to an endpoint on a private network inside the firewall. Therefore, if any of the calling MTA, the callee gateway, or the MGCP call agent are behind a NAT firewall, the call signaling messages will be lost and "inbound" UDP/IP channels can not be established.

With respect to the media session, relay servers have been proposed which enable MTA's behind a NAT firewall to establish a UDP/IP channel to a relay server with a globally addressable IP address. The relay server receives RTP streams from each MTA or gateway and forwards to the other MTA or gateway over the same UDP/IP channel established by the MTA or gateway through its NAT firewall. One such solution is described in more detail in U.S. patent application Ser. No. 10/627,594 entitled Firewall Penetration System and Method for Real Time Media Communications which is commonly assigned herewith and incorporated herein.

With respect to call signaling, various proposals have been made for exchanging call signaling messages on UDP/IP channels opened by an MTA inside a NAT firewall to a call agent with a globally addressable IP address. One problem with such solutions is that they require modifying known call agent systems such that: i) signaling to the MTA must occur using the same UDP/IP channel on which the MTA signals the call agent; and ii) periodic keep-alive messages must be exchanged over such UDP/IP channel to assure that the NAT firewall does not close the channel due to time out. While modifying known solutions can be technically feasible, implementing compatible modifications to known solutions developed by multiple providers is logistically impractical. Another problem with such solutions is that they still require the call agent to have a globally addressable IP address—they do not enable the call agent to operate behind a NAT firewall.

Because of the wide spread use of NAT firewalls which typically provide both IP address translation and port translation of all frames sent from the private network to the Internet and because any of the caller MTA, callee MTA, and the MGCP call agent may be behind such a NAT firewall, what is needed is a solution for penetrating firewall systems for real time media communication that does not suffer the disadvantage of such known systems.

SUMMARY OF THE INVENTION

A first aspect of the present invention is to provide a media gateway control protocol (MGCP) proxy server for interfacing a plurality of MGCP gateways with a plurality of MGCP call agents independent of whether each of the gateways is served by a network address translation server. Each gateway may be a multi-media terminal adapter (MTA). A second aspect of the present invention is to provide an MGCP proxy server for interfacing a plurality of MGCP gateways with at an MGCP call agent wherein the call agent is coupled to a private network and assigned a private network Internet protocol (IP) address un-routable on the Internet.

The proxy server comprises a public network interface coupled to the Internet and assigned a public network IP address for exchanging MGCP messages over the Internet. If the call agent is on a private network, the proxy server further comprises a private network interface coupled to the private network and assigned a private network IP address for exchanging MGCP messages with the call agent over the private network.

The proxy server includes a database storing a plurality of maps for performing the applicable MGCP message translation. Among the various maps discussed herein are: i) a notified entity map which associates each of the plurality of gateways with a one of the plurality of call agents which supports the gateway; ii) a registration map associating each of the plurality of gateways with a public socket on which an MGCP message was received from the gateway and an indication of a predetermined time window during which the public socket is valid; iii) a gateway request map; and iv) a call agent request map.

For each of a plurality of MGCP messages generated by a gateway and translated by the proxy server, the gateway request map associates a message transaction ID assigned to the MGCP message by the gateway with a unique transaction ID assigned to the MGCP message by the proxy server.

For each of a plurality of MGCP messages received from a call agent and translated by the proxy server, the call agent request map associates a message transaction ID assigned to the MGCP message by the call agent and a unique transaction ID assigned to the MGCP message by the proxy server.

A translation module receives an MGCP message generated by a gateway and addressed to the IP address assigned to the public network interface. The MGCP message comprises a message transaction ID assigned by the gateway and an endpoint ID identifying the gateway. The endpoint ID comprises a local endpoint name and a domain name.

The translation module generates a unique transaction ID for assignment to the MGCP message and creates a translated message by: i) substituting the unique transaction ID in place of the message transaction ID; and ii) substituting an IP address assigned to the network interface (through which the proxy server communicates with the call agent) in place of the domain name of the endpoint ID of the MGCP message.

The translated message is then provided to the network interface through which the proxy server communicates with the call agent for sending to the call agent.

Further, the translation module writes information applicable to the translation to the various maps. An example includes: i) writing each of the unique transaction ID and the message transaction ID to a record of the gateway request map; and ii) writing the public socket on which the message was received from the gateway to the record associated with the gateway in the registration map and updating the indication of the predetermined time window to a time period following receipt of the MGCP message.

The translation module further may receive an MGCP message from a call agent. Such MGCP message includes an endpoint ID comprising a local endpoint name uniquely associated with a gateway and the IP address assigned to the network interface through which the call agent communicates with the proxy server.

The translation module generates a unique transaction ID for assignment to the MGCP message and creates a translated message by: i) substituting the unique transaction ID in place of the message transaction ID; and ii) substituting the domain name of the endpoint ID associated with the gateway in place of the IP address assigned to the network interface in the endpoint ID of the MGCP message.

The translation module: i) provides the translated message to the gateway by addressing the translated to the public socket which is associated with the gateway in the registration table; and ii) then writes applicable data to the various maps.

The proxy server further reverse translates responses to MGCP messages. With respect to responses generated by the call agent, the MGCP response comprises the unique transaction ID. The translation module reverse translates the MGCP response to create a translated response by obtaining the message transaction ID associated with the unique transaction ID in the gateway request map and substituting the message transaction ID in place of the unique transaction ID in the MGCP response.

With respect to responses generated by the gateway, the MGCP response comprises the unique transaction ID and an endpoint ID comprising the local endpoint name and the domain name of the gateway. The translation module reverse translates the MGCP response to generate a translated response by: i) obtaining the message transaction ID associated with the unique transaction ID in the call agent request map and substituting the message transaction ID in place of the unique transaction ID in the MGCP response; and ii) substituting the IP address assigned to the network interface in place of the domain name in the endpoint ID of the MGCP response.

The proxy server further monitors the indication of the predetermined time period during which the public socket is valid for each gateway. A MGCP audit endpoint (AUEP) message is sent to the gateway by addressing the MGCP message to the public socket during the predetermined time period to prevent the public socket from "timing out". Upon receiving a response message from the gateway, the public socket from which the response message was received is written to the registration table and the indication of the predetermined time window is updated to a time period following receipt of the response message.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 8 represents an exemplary registration table in accordance with one embodiment of the present invention;

FIG. 9 represents an exemplary notified entity map in accordance with one embodiment of the present invention;

FIG. 10 represents an exemplary MTA original request map in accordance with one embodiment of the present invention;

FIG. 11 represents an exemplary proxy MTA request map in accordance with one embodiment of the present invention;

FIG. 12 represents an exemplary call agent original request map in accordance with one embodiment of the present invention;

FIG. 13 represents an exemplary proxy call agent request map in accordance with one embodiment of the present invention;

FIG. 30 is a representation of an exemplary MGCP message in accordance with one embodiment of the present invention.

DETAILED DESCRIPTION OF THE EXEMPLARY EMBODIMENTS

Figure 1:
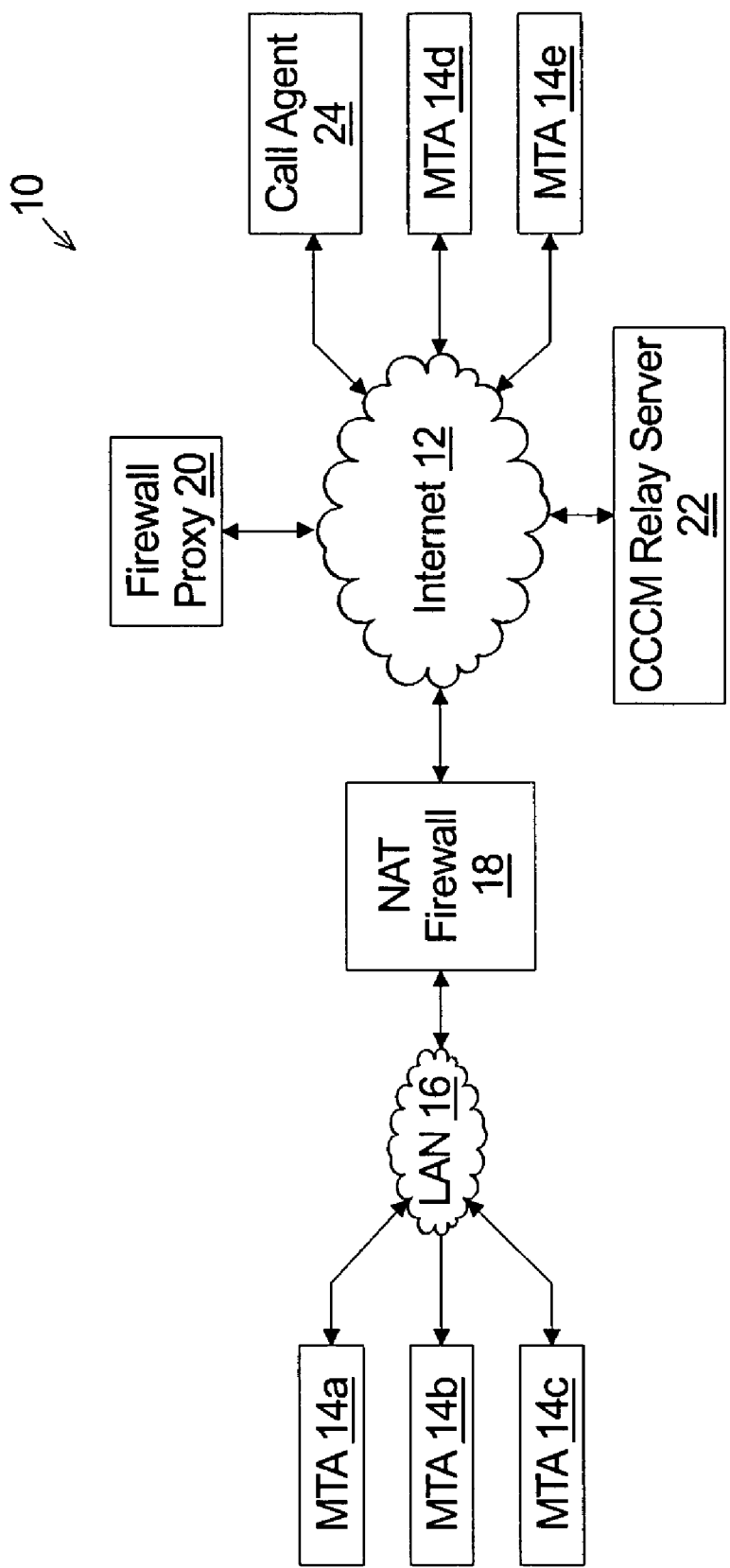
FIG. 1 is a block diagram of a first implementation of a real time media communication system in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

The block diagram of FIG. 1 represents a first implementation of a system 10 for supporting real time audio communications between two endpoint multi-media terminal adapters (MTAs) 14 over a packet switched network such as the Internet 12. The system 10 is architected such that certain MTAs (e.g. MTAs 14a, 14b, and 14c) are coupled to a local area network 16. The local area network 16 is coupled to the Internet 12 through a network address and port translation firewall (NAT) 18.

The local area network functions in a similar manner to the Internet 12 utilizing IP protocols. However, the IP network address assigned to each device coupled to the local area network 16 will be an IP addresses selected from a class of IP network addresses reserved for private networks (e.g. a private IP address) which are un-routable on the Internet 12.

The system further includes a firewall proxy 20, an MGCP call agent 24, a centralized call control manager (CCCM) relay server 22, and MTAs 14d and 14e—all of which are coupled to the Internet 12. For purposes of describing the present invention, MTAs 14*d* and 14*e* are referred to as Internet MTAs.

It should be appreciated that each of the devices which is referred to as "coupled to the Internet 12" may be coupled to an Internet service network which assigns a globally unique IP address (e.g. a public IP address) to the call agent 24 and does not utilize a NAT firewall. For purposes of simplicity, such Internet service network is not shown and the device is simply referred to as "coupled to the Internet 12".

The system 10 enables communication between any combination of MTAs 14 including between a private network MTA and another private network MTA (on the same private network or on different private networks), between a private network MTA and an Internet MTA, and between two Internet MTAs.

Each MTA 14 may be a known system for operating as an MGCP gateway. For purposes of illustrating the present invention, each MTA 14 performs the following known MGCP gateway functions which relate to session signaling: i) generate restart in progress (RSIP) messages to a predetermined call agent 24 (identified by IP address) when the MTA 14 is being put into service (such as at power up); ii) generate notify (NTFY) messages to inform the call agent 24 of various events such as on hook, off hook, dialing and ringing of one of the telephones (not shown) supported by the MTA 14; iii) generate a delete connection (DLCX) message to delete a media session connection associated with the MTA 14 (to terminate a media session when a user "hangs up" one of the telephones supported by the MTA 14); and iv) provides an applicable response message in response to any of a request notification (RQNT) message, a create connection (CRCX) message, a modify connection (MDCX) message, a delete connection (DLCX) message; an audit endpoint (AUEP) message; an audit connection (AUCX) message, and an endpoint configuration (EPCF) message which may be received from a call agent 24 (or from the firewall proxy 20 emulating the call agent).

The MTA 14 utilizes the same UDP/IP port number for both sending messages to, and receiving messages from, the call agent 24 (or the firewall proxy 20 emulating the call agent 24) such that UPP/IP messages sent from the call agent 24 (or firewall proxy 20) can be routed by the NAT firewall 18 to the MTA 14 in the event that the MTA 14 is a private network MTA such as MTA 14*a*, 14*b*, or 14*c*.

The MTA 14 further utilizes the same UDP/IP port number for both sending and receiving frames representing the media session such that the UDP/IP frames sent from the other endpoint of the media session can be routed by the NAT firewall 18 to the MTA 14 in the event that the MTA 14 is a private network MTA.

The call agent 24 may be a known system for operating as an MGCP call agent in accordance with known MGCP protocols. For purposes of illustrating the present invention, the call agent 24 performs the following known MGCP call agent functions: i) generates applicable request notification (RQNT) messages to supported gateways; ii) generates applicable create connection (CRCX) messages to supported gateways; iii) generates applicable modify connection (MDCX) messages to supported gateways; iv) generates applicable delete connection. (DLCX) messages to supported gateways; v) generates applicable audit endpoint (AUEP) messages to supported gateways; vi) generates applicable audit connection (AUCX) messages to supported gateways; vii) generates applicable endpoint configuration (EPCF) messages to supported gateways; and viii) generates applicable responses to each of a restart in progress (RSIP) message, notify (NTFY) message, and delete connection (DLCX) message which may be received from a supported gateway. Each of the above messages and its use is discussed in more detail herein.

The NAT firewall 18 performs both address translation and port translation on each IP frame that is routed to the NAT firewall on the local area network 16. The address translation includes translating the source IP address of the IP frame to a globally unique IP address assigned to the NAT firewall 18. Port translation includes translating the source port number of the IP frame to a port number available to the NAT firewall 18.

The translation of each outbound frame is recorded in a record within a translation table. The translation table record associates the private network source IP address and source port number of the outbound frame (e.g. the frame routed to the NAT firewall 18 on the local area network 16) to the globally unique IP address of the NAT firewall 18 and the port number assigned by the NAT firewall 18. For added security, the translation table record may further include the destination network address and port number to which the outbound frame was addressed.

An inbound frame will include a destination address and port number. The destination address is the globally unique address of the of the NAT firewall 18. The globally unique address of the NAT firewall 18 is what enables the inbound frame to be routed to the NAT firewall 18 over the Internet 12. The NAT firewall 18 will then look up, in the translation table, the local area network IP address and port number (source socket of the outbound IP frame) which associates with the UDP address to which the inbound frame was addressed. For security, the NAT firewall 18 may further verify that the source address and port number of the inbound frame matches the destination address and port number of the outbound frame—as stored in the translation table.

Provided a record exists in the translation table, the NAT firewall 18 will reverse translate the inbound frame by replacing the destination address and port number of the inbound frame with the source address and port number of the outbound frame. The reverse translated frame is then routed on the local are network 16.

Because an inbound frame can only be routed on the local area network 16 if it corresponds to a record in the translation table, the NAT firewall 18 prevents a device coupled to Internet 12 from sending an IP frame to the client on the local area network 16 unless that IP frame is an inbound frame that is sent in response to an outbound frame originated by the client and uses the UDP/IP channel established by the outbound frame.

The firewall proxy 20 and the CCCM relay server 22, each include the structure and function that, in combination with the call agent 24, provide for: i) a private network MTA 14*a*, 14*b*, or 14*c* to initiate a VoIP media session between such private network MTA and another private network MTA; ii) a private network MTA 14*a*, 14*b*, or 14*c* to initiate a VoIP media session between such private network MTA and an Internet MTA 14*d* or 14*e*; iii) an Internet MTA 14*d* or 14*e* to initiate a VoIP media session between such Internet MTA and a private network MTA; and iv) an Internet MTA 14*d* or 14*e* to initiate a VoIP media session between such Internet MTA and another Internet MTA.

Figure 3:
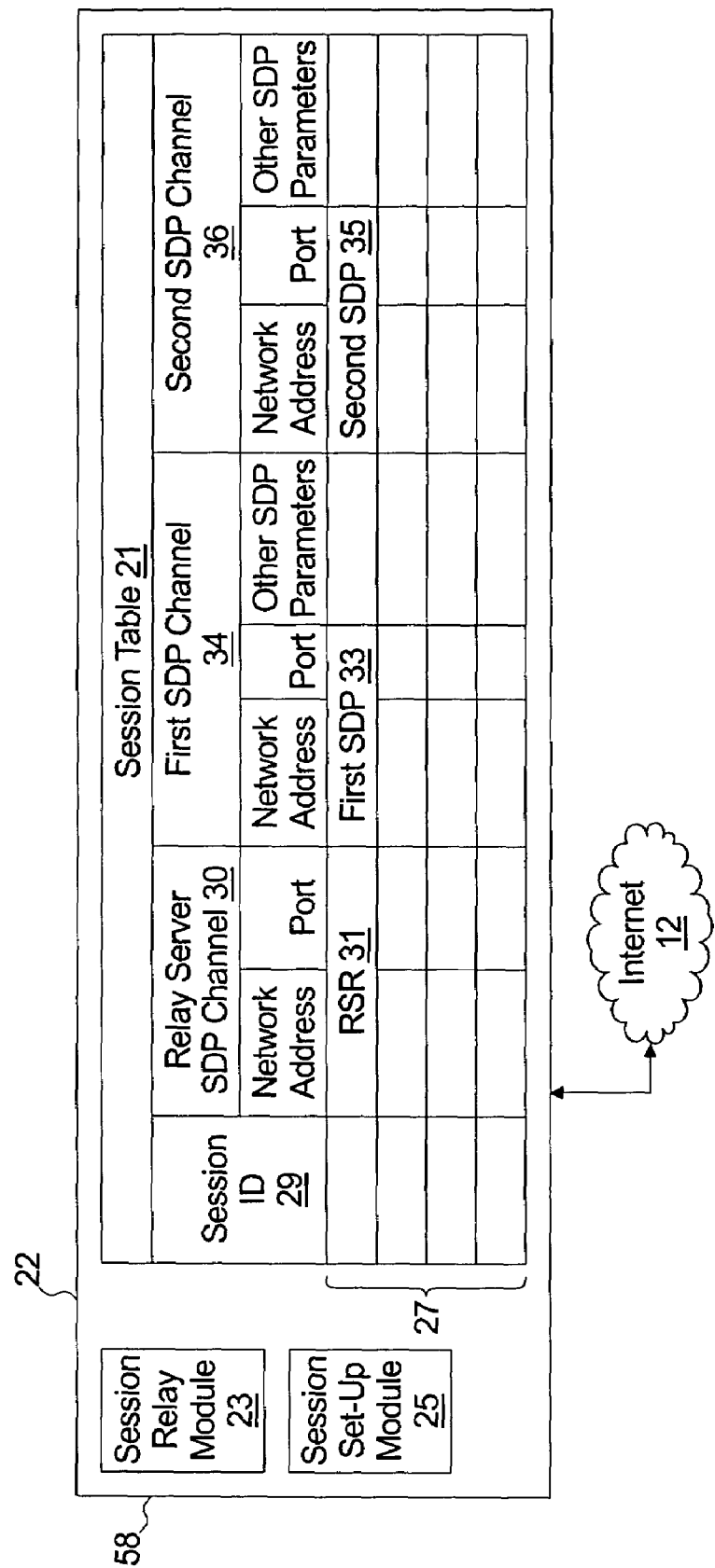
FIG. 3 is a block diagram representing an exemplary centralized call control manager relay server in accordance with one embodiment of the present invention.

Referring to FIG. 3, a block diagram of the CCCM relay server 22 is shown. The relay server 22 may be embodied in typical server hardware for operating a session relay module 23, a session set up module 25, a session table 21, and various network interface circuits and IP service modules for communicating with other devices coupled to the Internet 12.

The session table 21 comprises a plurality of records 27. Each record 27 includes information to support a single RTP media session being relayed through the CCCM relay server 22 between the two endpoint MTAs 14. Each record 27 comprises a session ID field 29 which identifies the media session using a unique session ID number assigned by the firewall proxy 20 and received by the session relay server 22 as part of an SDP request message sent by the firewall proxy 20 to the CCCM relay server 22. The record 27 associates, with the session ID: i) a unique relay server resource 31 assigned to the session and stored in a relay server SDP channel field 30; ii) first SDP channel information 33 (including an IP address and UDP port number) stored in a first SDP channel field 34; and iii) second SDP channel information 35 (including an IP address and UDP port number) stored in a second SDP channel field 36. The relay server resource 31 comprises a unique UDP port number of the CCCM relay server 22 to which each of the MTAs will address UDP frames representing the media session for relay to the other MTA.

The first SDP channel 33 includes the IP address and port number used to send frames representing the media session to a first one of the two endpoint MTA's. If the MTA is a private network MTA, the first SDP channel 33 includes the IP address of the NAT firewall supporting the private network MTA and the UDP port number assigned to the outbound media session channel by the NAT firewall. Similarly, the second SDP channel 35 includes the IP address and port number used to send frames representing the media session to a second one of the two endpoint MTA's. Again, if the MTA is a private network MTA, the second SDP channel 35 includes the IP address of the NAT firewall supporting the private network MTA and the UDP port number assigned to the outbound media session channel by the NAT firewall.

Figure 4:
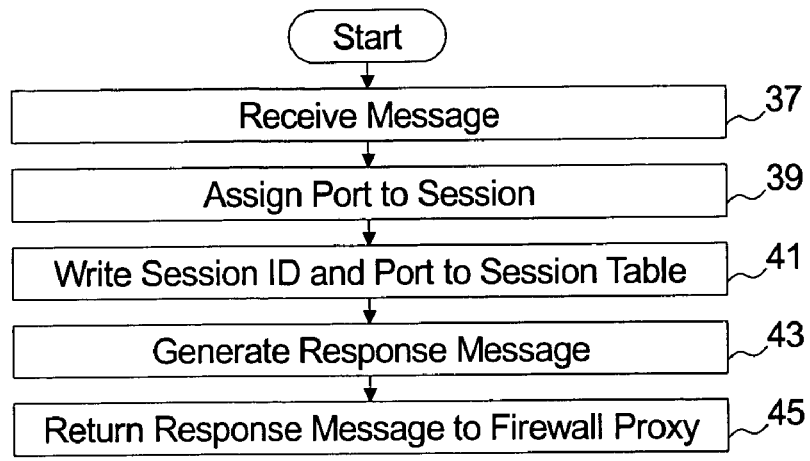
FIG. 4 is a flow chart representing exemplary operation of a session set up module of the relay server in accordance with one embodiment of the present invention.

The session set up module 25 receives each SDP request message from a firewall proxy 20, assigns a relay server resource to the request, returns an SDP response message to the firewall proxy 20, and populates a portion of the session table 21. More specifically, operation of the session set up module 25 is represented by the flow chart of FIG. 4.

Step 37 represents receiving an SDP request message sent to the CCCM relay server 22 by a firewall proxy 20 and step 39 represents assigning a relay server resource 31 (e.g. a UDP port number) to the session. The UDP port number in combination with the IP address of the CCCM relay server 22 defines a relay server resource 31 to which each of the two MTAs may address frames representing an RTP media session for relay to the other of the two MTAs.

Step 41 represents writing the session ID and the relay server resource 31 to a new record 27 in the session table 21. Further, in the event that the SDP request message includes SDP channel information (e.g. an IP address, port number, and other RTP information for transmission of UDP frames representing the media session to one of the other of the two MTAs), such SDP information is written to the first SDP channel fields 33 of the session table 21.

Step 43 represents building an SDP response message which identifies the relay server resource 31. Step 45 represents sending the SDP response message to the firewall proxy server 20 that initiated the SDP request message.

At some point in time thereafter, the CCCM relay server 22 will begin receiving media addressed to the relay server resource 31. Such media will be from each of the two MTAs between which the session relay module 23 of the CCCM relay server 22 is to relay the media session.

Figure 5:
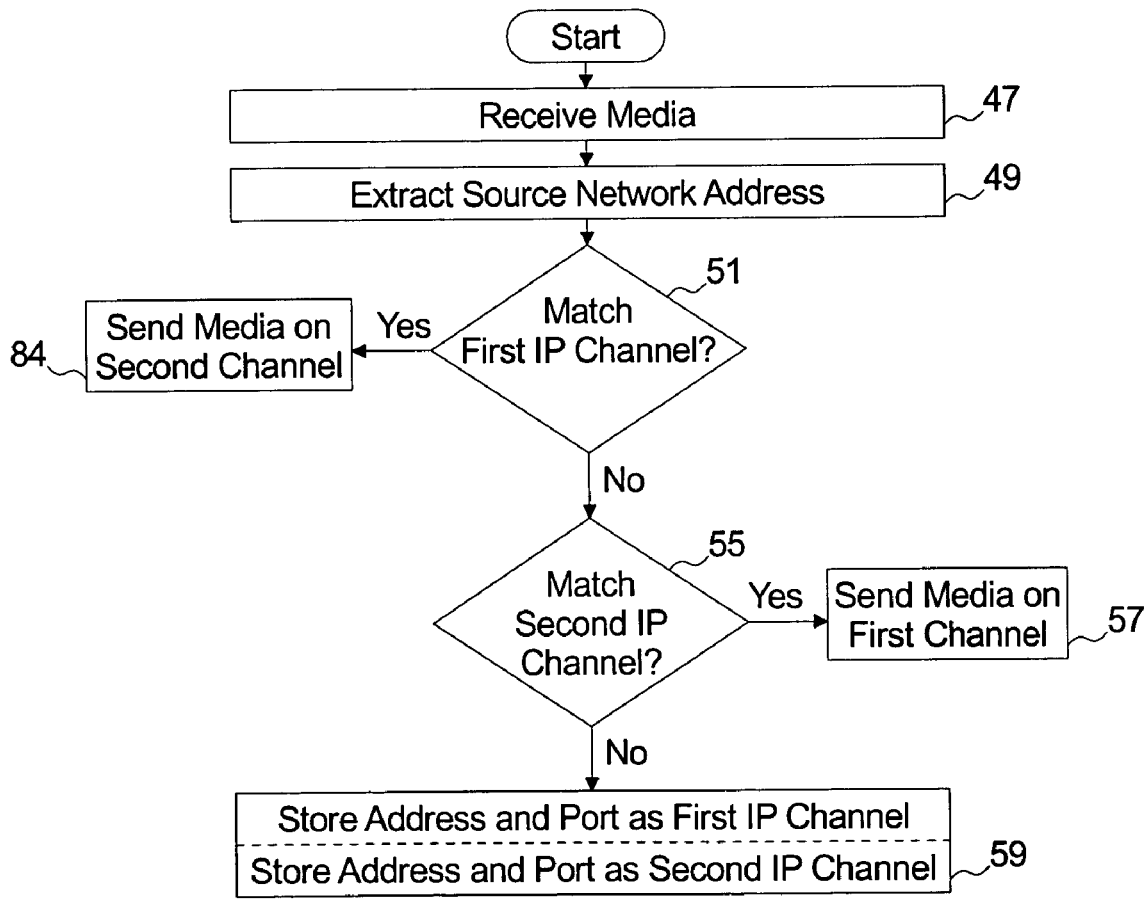
FIG. 5 is a flow chart representing exemplary operation of a session relay module of the relay server in accordance with one embodiment of the present invention.

The flow chart of FIG. 5 shows exemplary operation of the session relay module 23. Step 47 represents receiving first UDP/IP frames addressed to the relay server resource 31. The UDP/IP header of such frames will include a source IP address and a source UDP port number which define an SDP channel to which frames representing the RTP session from the other endpoint MTA may be sent.

Step 49 represents extracting such source network address and source UDP port number from the received media and step 51 represents comparing the extracted source network address of the first SDP channel 33 as identified in the record 27 associated with the relay server resource 31. If the two addresses match, then the media is forwarded, at step 53, to the other MTA using the second SDP channel 35 as identified in the record 27 associated with the relay server resource 31.

If, at step 51, the source IP address and UDP port number do not match those of the first SDP channel 33, the source IP address and UDP port number are compared to those of the second SDP channel 35 at step 55.

If the two address match, then the media is forwarded, at step 57, to the other MTA using the first SDP channel 33 as identified in the record 27 associated with the relay server resource 31.

If the extracted network address and UDP port number do not match those of either the first SDP channel 33 or the second SDP channel 35, then the extracted network address and an extracted port number are written to the session table 21 as either: i) the first SDP channel field 34 as the first SDP channel 33; or ii) the second SDP channel field 36 as the second SDP channel 35. The session relay module 23 alternates to which of the first SDP channel field 34 and the second SDP channel field 36 it will write the extracted IP address and port number.

It should be appreciated that the above described operation of the CCCM relay server 22 enables two MTAs (whether private network MTAs or Internet MTAs) to each send UDP/IP frames addressed to the IP address and UDP port number of the relay server resource 31 and, based on the source IP address and source UDP port number of such frames, the CCCM relay server 22 is able to distinguish from which MTA the UDP frame was sent and relay the frame to the other MTA. The operations described with respect to FIG. 5 provide for the relay module 23 to extract SDP channels from frames received from both endpoint MTAs and begin the relaying of frames with loss of only the first few frames.

The firewall proxy 20 enables session signaling between MTAs (whether private network MTAs or Internet MTAs) and the call agent 24 and provides for modifying such signaling messages as needed: i) to assure that the session signaling messages can be sent to an MTA even if the MTA is a private network MTA; and ii) to provide the relay server resource 31 assigned by the CCCM relay server 22 to each of the MTAs in the event that at least one of the two MTAs is a private network MTA.

From the perspective of the private network MTAs 14a-14c, the firewall proxy 20 emulates the MGCP call agent 24. From the perspective of the call agent 24, the firewall proxy 20 emulates a multi-port MTA 14. A more detailed discussion of the structure and function of the firewall proxy 20 and its operation is included herein.

Figure 6A:
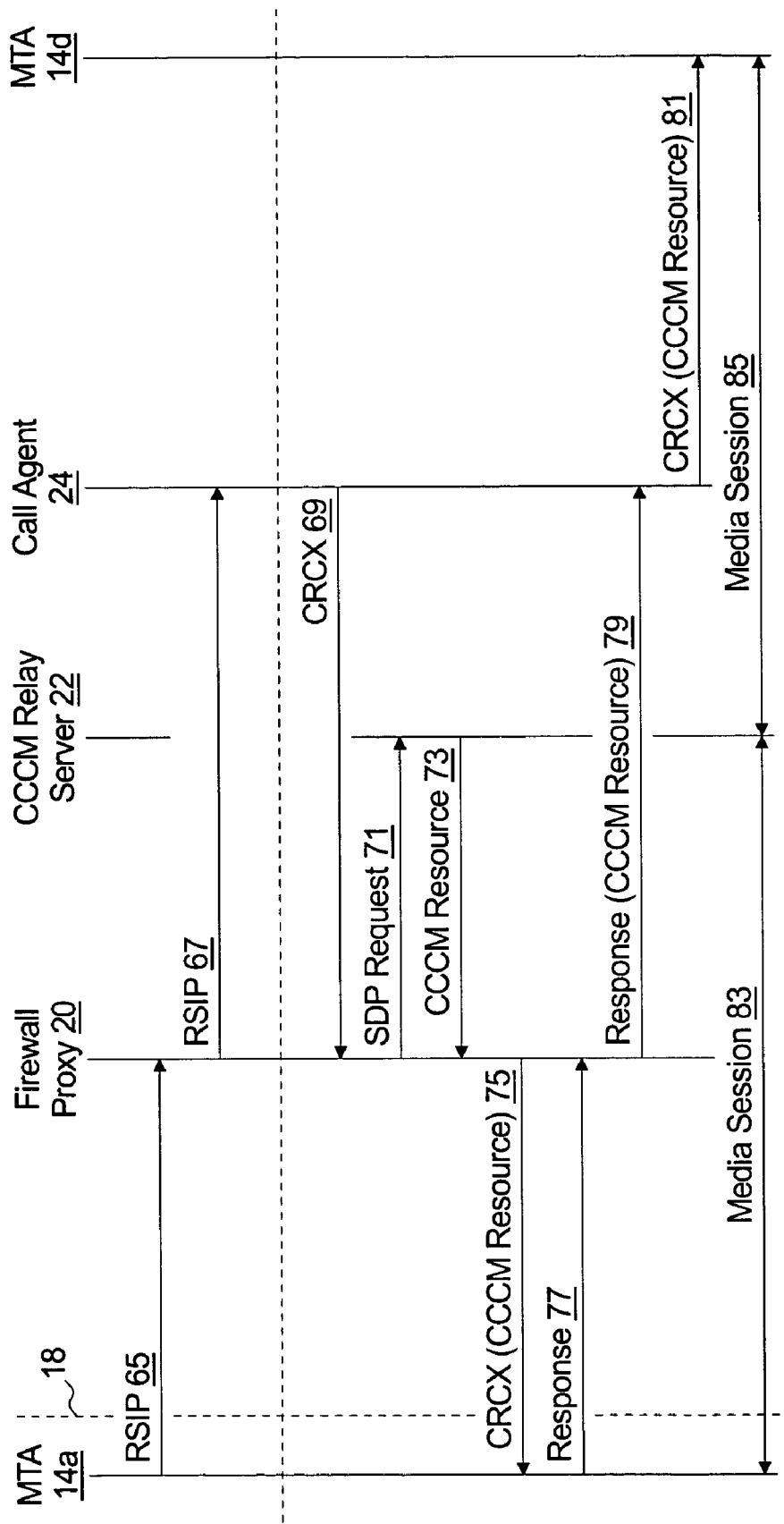
FIG. 6a is a ladder diagram representing media session set up signaling in accordance with the first implementation of the real time media communication system in accordance with one embodiment of the present invention.

The ladder diagram of FIG. 6a represents a portion of MGCP signaling which may occur to: i) activate a private network MTA 14a with the call agent 24; and ii) signal a call from an Internet MTA 14d to the private network MTA 14a in a first embodiment of the present invention (e.g. FIG. 1) wherein the firewall proxy 20, the call agent 24, and the CCCM relay server 22 are all coupled to the Internet 12.

To register with the call agent 24, the MTA 14a sends a restart in progress (RSIP) message addressed to a preconfigured IP address at step 65. In a typical MGCP implementation, this IP address would represent the call agent supporting the MTA 14a, however, in this invention, the preconfigured IP address is that of the firewall proxy 20.

Figure 17:
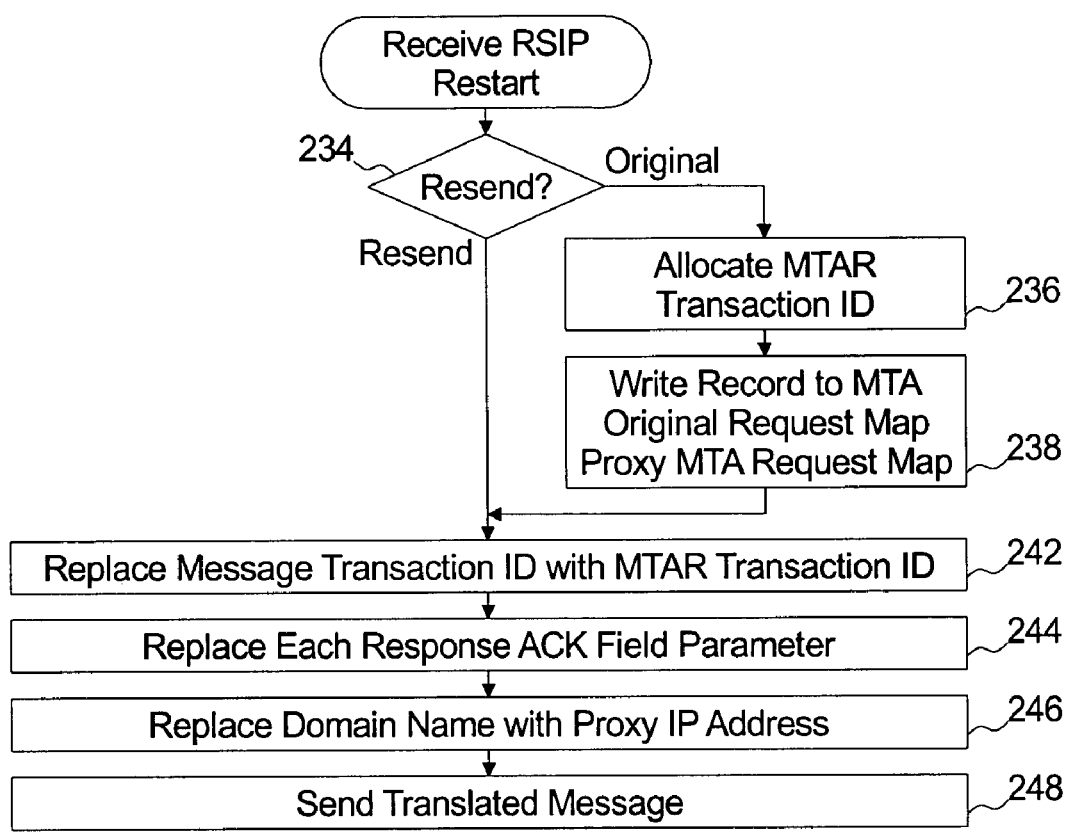
FIG. 17 is a flow chart representing exemplary operation of a firewall proxy work thread module of the firewall proxy in accordance with one embodiment of the present invention.

The firewall proxy 20 translates the RSIP message as discussed in more detail with respect to FIG. 17 and forwards the translated RSIP message to the call agent 24 at step 67. As discussed, the firewall proxy 20 emulates an MTA when communicating with the call agent 24, as such, the information within the modified RSIP message corresponds to the firewall proxy 20 being the MTA 14a.

The call agent 24 responds to the translated RSIP message with an applicable response message. The firewall proxy 20, upon receiving the response message, translates the response message as discussed in more detail with respect to FIG. 20 and returns the translated response message to the MTA 14a. Return of the response message and the translated response message are not shown on FIG. 6a.

At some later point in time after the registration steps have been performed, various messages (not shown) maybe exchanged between the call agent 24 and the Internet MTA 14d which in the aggregate instruct the call agent 24 to set up a media session between the MTA 14d (caller) and the MTA 14a (callee). To set up the media session, the call agent 24 generates a connection request (CRCX) message which is provided to the firewall proxy 20 (which is emulating the MTA 14a) at step 69.

Because the MTA 14a is a private network MTA, its private network IP address is un-routable on the Internet 12 and therefore the media session must be relayed through the CCCM relay server 22.

To establish the relay through the CCCM relay server 22, the firewall proxy 20 sends an SDP request message to the CCCM relay server 22 to obtain a relay server resource 31. It should be appreciated that because the CCCM relay server 22 is located on the Internet 12, it will be assigned a globally unique IP address and any device, even if behind a NAT firewall, can send a UDP/IP frame to the IP address and port number of the relay server resource 31.

Step 73 represents the CCCM relay server 22 returning the relay server resource 31 to the firewall proxy 20.

Step 75 represents the firewall proxy 20 generating a translated CRCX message for forwarding to the MTA 14. The translated CRCX message will comprise the relay server resource 31 in place of the SDP channel provided by the call agent 24. As such, the MTA 14 may send a sequence of UDP/IP frames representing the media session to the relay server resource 31.

Step 77 represents the MTA 14a providing a response to the translated CRCX message. The response will include an SDP channel of the MTA 14a which, as discussed, will include an un-routable IP address.

The firewall proxy 20 translates the response and provides a translated response to the call agent 24 at step 79. The translated response will include the relay server resource 31 in place of the un-routable SDP channel of the MTA 14a.

In turn, the call agent 24 provides a CRCX message (or a MDCX message) to the MTA 14d. Such message includes the relay server resource 31 to which the MTA 14d is to address a sequence of UDP/IP frames representing the media session.

Relay of the sequences of UDP/IP frames by the CCCM relay server 22 as discussed with respect to the FIG. 5 is represented by steps 83 and 85.

Figure 2:
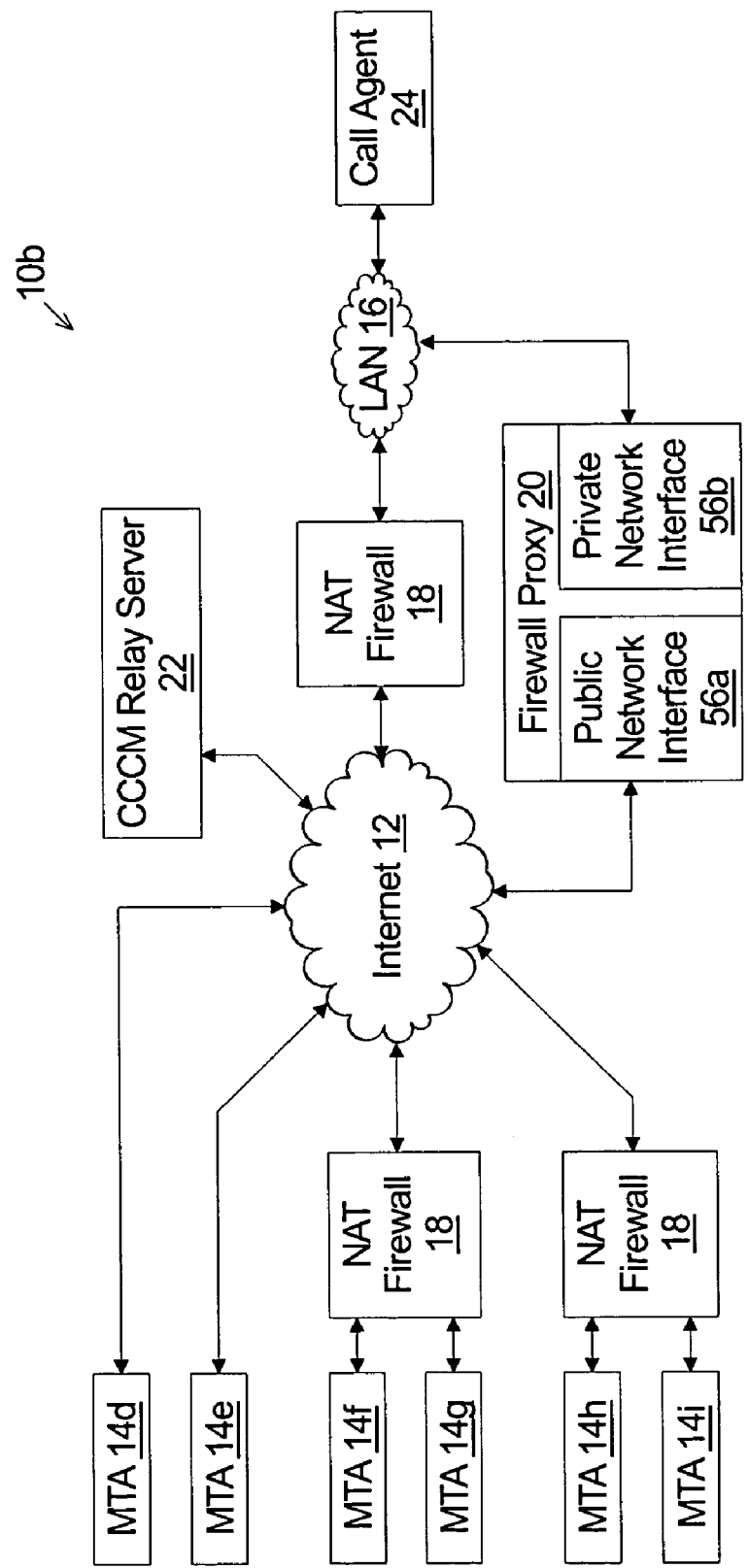
FIG. 2 is a block diagram of a second implementation of a real time media communication system in accordance with one embodiment of the present invention.

The block diagram of FIG. 2 represents a second implementation of the system 10 for supporting real time audio communications between two MTAs 14 over a packet switched network such as the Internet 12. Similar to the first embodiment, the second embodiment system comprises: i) private network MTAs such as MTAs 14f through 14i—each of which is coupled to a local area network (not shown) and communicating with other devices over the Internet 12 through a NAT firewall 18; ii) Internet MTAs such as MTAs 14d and 14e which couple to the Internet 12 through an ISP that does not utilize network address translation; iii) a relay server 22 coupled to the Internet 12; iv) a call agent 24; and v) a firewall proxy 20. The second embodiment differs from the first embodiment in that the call agent 24 is coupled to a local area network 16 and the firewall proxy 20 includes a public network interface 56a coupled to the Internet 12 and a private network interface 56b coupled to the local area network 16.

Communication between the firewall proxy 20 and the call agent 24 is over the local area network 16. Communication between the firewall proxy 20 and: i) the MTAs; and ii) the CCCM relay server 22 is over the Internet 12.

The firewall proxy 20 and the CCCM relay server 22, each include structure and function that, in combination with the call agent 24, provide for: i) a private network MTA 14f through 14i to initiate a VoIP media session between such private network MTA and another private network MTA; ii) a private network MTA 14f through 14i to initiate a VoIP media session between such private network MTA and an Internet MTA 14d or 14e; iii) an Internet MTA 14d or 14e to initiate a VoIP media session between such Internet MTA and a private network MTA; and iv) an Internet MTA 14d or 14e to initiate a VoIP media session between such Internet MTA and another Internet MTA. Again, from the perspective of the MTAs 14, the firewall proxy 20 emulates an MGCP call agent. From the perspective of the call agent 24, the firewall proxy emulates a multi-port MTA 14.

Figure 6B:
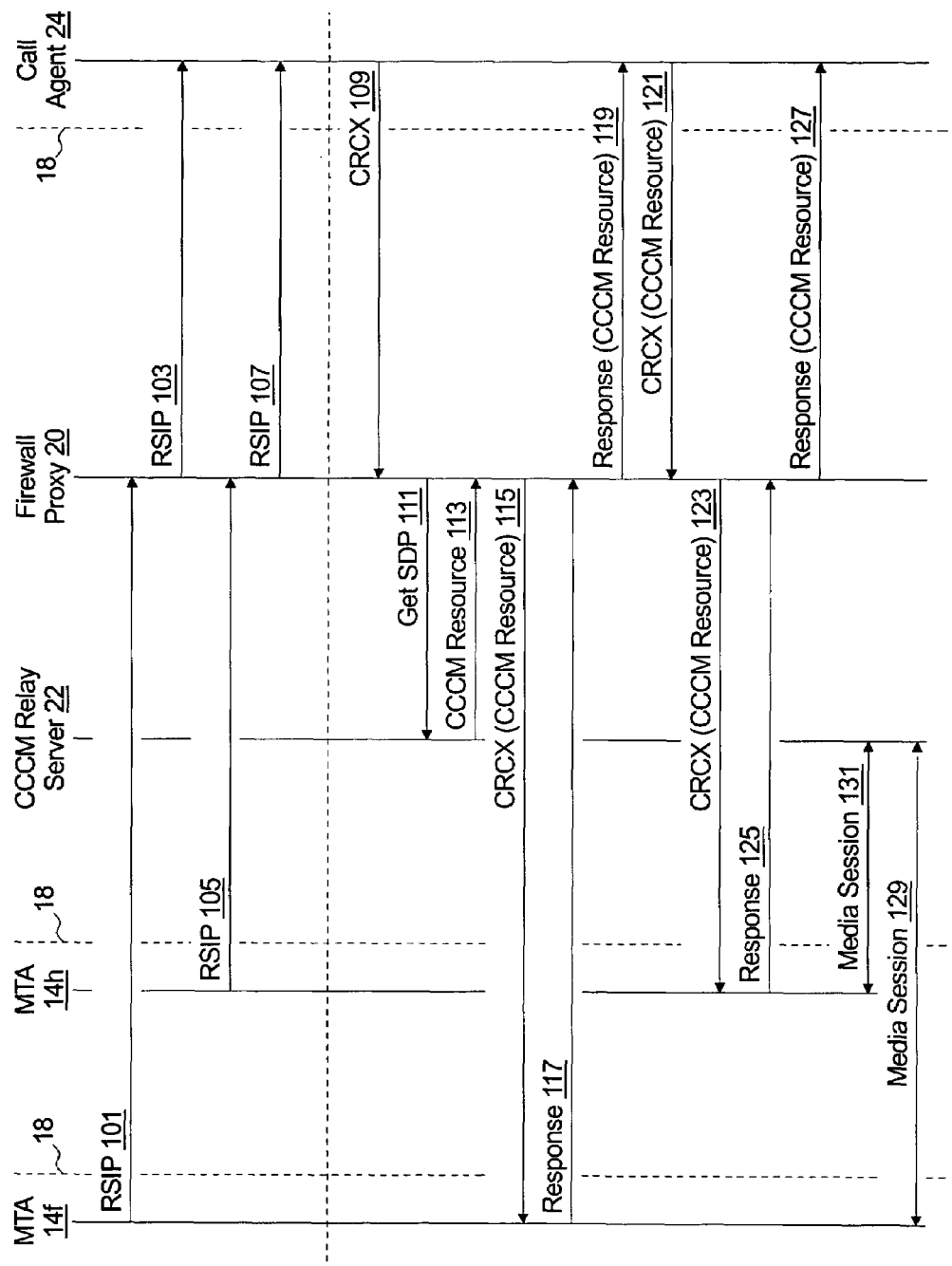
FIG. 6b is a ladder diagram representing media session set up signaling in accordance with the second implementation of the real time media communication system in accordance with one embodiment of the present invention.

The ladder diagram of FIG. 6b represents a portion of MGCP signaling which may occur to: i) register each of a private network MTA 14f and a private network MTA 14h with the call agent 24; and ii) signal a call initiated by the private network MTA 14h to the private network MTA 14f in a second embodiment of the present invention (e.g. FIG. 2) wherein the call agent 24 is coupled to the local area network 15 and the firewall proxy 20 is coupled to both the local area network 16 and the Internet 12.

Step 101 represents the MTA 14f sending a restart in progress (RSIP) message addressed to a preconfigured IP address. As discussed, in the typical MGCP implementation, this IP address would represent the call agent supporting the MTA 14f, however, in this invention, the preconfigured IP address is the public IP address assigned to the public network interface 56a of the firewall proxy 20.

The firewall proxy 20 translates the RSIP message as discussed in more detail with respect to FIG. 17 and forwards the translated RSIP message to the call agent 24 through its private network interface 56b over the local area network 16 at step 103. Because the call agent 24 and the firewall proxy 20 are coupled to the same local area network 16 and because each is assigned a private network IP address on the local area network 16, frames between the two are routable. As discussed, the firewall proxy 20 emulates an MTA when communicating with the call agent 24, as such, the information within the modified RSIP message corresponds to the firewall proxy 20 being the MTA.

The call agent 24 responds to the translated RSIP message with an applicable response message. The firewall proxy 20, upon receiving the response message, translates the response message as discussed in more detail with respect to FIG. 20 and returns the translated response message to the MTA 14*f*. Return of the response message and the translated response message are not shown on FIG. 6*b*.

Steps 105 and 107 represent the MTA 14*h* sending an RSIP message to register with the call agent 24 in a similar manner as the MTA 14*a* registered with the call agent at steps 101 and 103.

The call agent 24 responds to the RSIP message (as translated by the firewall proxy 20) with an applicable response message and the firewall proxy 20, upon receiving the response message, translates the response message and returns the translated response message to the MTA 14*h*. Return of the response message and the translated response message are not shown on FIG. 6*b*.

It should be appreciated that because the firewall proxy 20 emulates a multi-port MTA, from the perspective of the call agent 24, the firewall proxy 20: i) is coupled to the LAN 16 and assigned only a single private network IP address; and ii) is an MTA supporting two lines, one corresponding to MTA 14*f* and the other to MTA 14*h*. As will be discussed in more detail, the two response messages are distinguished by a unique message identifier assigned to each translated RSIP message.

At some time after both MTAs have been registered or activated with the call agent 24, various NTFY messages (not shown) may be exchanged between the call agent 24 and the MTA 14*h* which in the aggregate instruct the call agent 24 to set up a media session between the MTA 14*h* (caller) and the MTA 14*f* (callee). To set up the media session, the call agent 24 generates a connection request (CRCX) message which is provided to the firewall proxy 20 over the local area network 16 at step 109. Because the firewall proxy 20 is emulating a multi-port MTA, the CRCX message is addressed to the private network IP address of the firewall proxy and includes an endpoint ID with a local endpoint name which identifies the private network MTA 14*f* and a domain name which is the private network IP address assigned to the private network interface 56*b* of the firewall proxy 20.

The media session must be relayed through the CCCM relay server 22 such that each MTA can establish an outbound UPD/IP channel to the CCCM relay server 22 and the CCCM relay server 22 may relay the UDP/IP media stream as described with respect to FIG. 5.

To establish the relay through the CCCM relay server 22, the firewall proxy 20 sends an SDP request message to the CCCM relay server 22 to obtain a relay server resource 31 at step 111. As discussed with respect to FIG. 4, the CCCM relay server 22 allocates a relay server resource 31 and returns the relay server resource 31 to the firewall proxy at step 113.

Step 115 represents the firewall proxy 20 generating a translated CRCX message for forwarding to the MTA 14*f* over the Internet 12. The translated CRCX message will comprise the relay server resource 31 in place of the un-routable SDP channel of the MTA 14*h* such that the MTA 14*f* may send a sequence of UDP/IP frames representing the media session to the allocated relay server resource 31.

Step 117 represents the MTA 14*f* providing a response to the CRCX message over the Internet 12 address to the public IP address assigned to the public network interface 56*a* of the firewall proxy 20. The CRCX message includes an SDP channel of the MTA 14*f* to which the remote MTA may send a stream of UDP/IP frames representing the media session. However, because the MTA 14*f* is a private network MTA, the IP address of the SDP channel is un-routable on the Internet and therefore of no utility to provide in a response to the call agent.

At step 119, the firewall proxy 20 translates the response and provides a translated response to the call agent 24 over the LAN 16. The translated response includes the relay server resource 31.

In turn, the call agent 24 provides a CRCX message to the firewall proxy 20 over the local area network 16 at step 121. The CRCX message includes: i) an endpoint ID with the local endpoint name being that of the MTA 14*h* and a domain name being the private network IP address assigned to the private network interface 56*b* of the firewall proxy 20; and ii) the relay server resource 31 in place of the un-routable SDP channel.

Step 123 represents the firewall proxy 20 generating a translated CRCX message for forwarding to the MTA 14*f* over the Internet 12. Because the CRCX message already contains the relay server resource 31, the translated CRCX will include the same relay server resource 31.

Step 125 represents the MTA 14*h* providing a response to the CRCX message which includes an SDP channel of the MTA 14*h* to which the remote MTA may send a stream of UDP/IP frames representing the media session. However, because the MTA 14*h* is a private network MTA, the IP address of the SDP channel is un-routable on the Internet 12 and therefore of no utility to provide in a response to the call agent.

The firewall proxy 20 translates the response and provides a translated response to the call agent 24 over the local area network 16 at step 127. The translated response also includes the relay server resource 31.

Because each of the MTAs can send a sequence of UDP/IP frames representing the media session to the relay server resource 31 and the CCCM relay server 22 may relay the two sequences of UDP/IP frames as discussed with respect to the FIG. 5 and as represented by steps 129 and 131.

Firewall Proxy Structure

Figure 7:
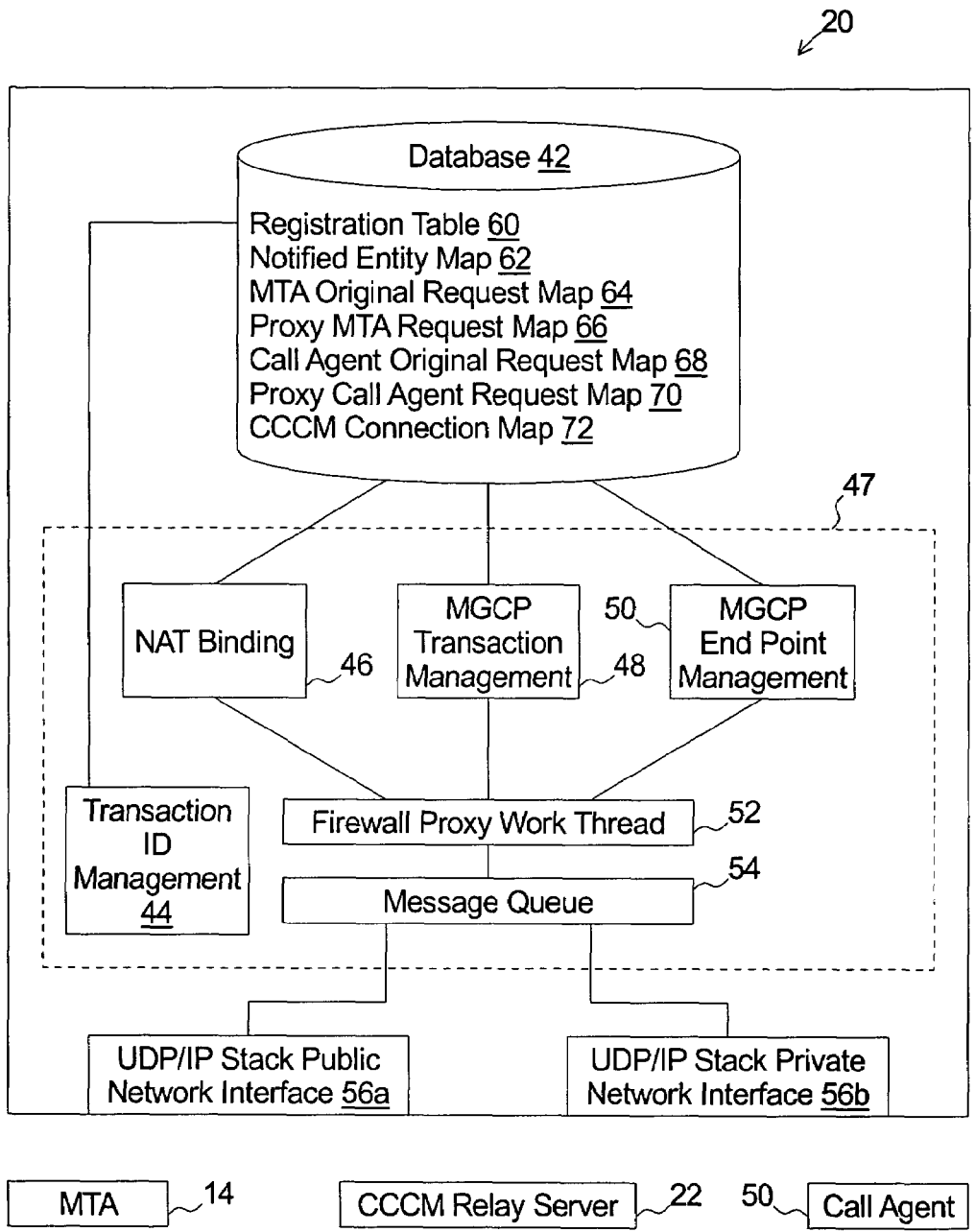
FIG. 7 is block diagram representing a firewall proxy in accordance with one embodiment of the present invention.

FIG. 7 represents a block diagram of the firewall proxy 20. The firewall proxy 20 comprises an Internet network interface and UDP/IP stack 56*a*, a LAN network interface and UDP/IP stack 56*b*, a database 42, and a translation module 47. The translation module comprises a transaction ID management module 44, a NAT binding module 46, an MGCP transaction management module 48, an MGCP endpoint management module 50, a firewall proxy work thread module 52, and a message queue 54.

UDP/IP Stack

Each network interface and UDP/IP stack 56*a* and 56*b* may be known hardware and software systems: i) for packaging an MGCP message (from the message queue) within a UDP/IP wrapper for transmission to a remote IP compliant device over a UDP channel; and ii) receiving a UDP/IP transmission from a remote IP compliant (addressed to an applicable destination port) device and delivering the message contents to the message queue 54 for handling by the work thread module 52.

Message Queue

The message queue 54 comprises an inbound message queue and an outbound message queue. The inbound message queue stores each of a plurality of MGCP messages received from any of the MTAs 14, the call agent 24, or the CCCM relay server 22 over UDP/IP channels and sequentially presents each message to the work thread module 52 for processing. The outbound message queue stores each of a plurality of MGCP messages produced by the work thread module 52 for presentation to the UDP/IP stack 56 for packaging and transmission to the applicable remote IP device.

Transaction ID Management

In general, the transaction ID management module 44 creates a unique transaction ID value to substitute for a transaction ID value provided by an MTA 14 or the call agent 24 in MGCP messages.

Because the firewall proxy may communicate with many MTAs 14 while emulating a single MTA when communicating with the call agent 24, it is possible that two or more of the multiple MTA's may generate the same transaction ID value. Without substituting a unique transaction ID value generated by the transaction ID management module 44, the situation would result in multiple messages arriving at the call agent 24 with the same transaction ID value and multiple responses arriving back at the firewall proxy server 20 with the same transaction ID value. At this time the firewall proxy server 20 would be unable to route the response to the correct MTA.

Therefore, the transaction ID management module 44 will, upon receiving a processing call from the MGCP transaction management module 48, generate and return a unique transaction ID.

Database

The database 42 stores a plurality of mapping tables, each comprising mapping data useful for operation of the NAT binding module 46, the transaction management module 48, and the end point management module 50 discussed herein.

The mapping tables comprise: i) a registration table 60; ii) a notified entity map 62; iii) an MTA original request map 64; iv) a proxy MTA request map 66; v) a call agent original request map 68; vi) a proxy call agent request map 70; and vii) a CCCM connection map 72.

Turning briefly of FIG. 8, an exemplary registration table 60 is shown. The registration table 60 comprises a plurality of records 96. Each record 96 associates an MTA endpoint ID (stored in an MTA endpoint ID field 74) with its public socket information (stored in a public socket field 80), its proxy endpoint ID (stored in a proxy endpoint ID field 86), its NAT timer value (stored in a NAT timer field 92), and an indication of whether the MTA is then currently active (stored in a status field 94).

The MTA endpoint ID field 74 comprises a pattern subfield 76 and a domain subfield 78. The pattern subfield 76 stores a unique local endpoint name associated with the MTA and the domain subfield 78 stores the IP address assigned to the MTA which, if the MTA is a private network MTA, will be a private network IP address.

The public socket field 80 comprises an IP address subfield 82 and a port number subfield 84. The IP address subfield 82 and the port number subfield 84 store the source IP address and source UDP port number written to UDP/IP source socket fields of a UDP/IP header by the NAT firewall 18 (FIG. 1) in translating a frame addressed to the firewall proxy 20.

The proxy endpoint ID field 86 comprises a pattern subfield 88 and a domain subfield 90. The pattern subfield 88 stores the unique local endpoint name associated with the MTA (e.g. the same local endpoint name as stored in the pattern subfield 76). The domain subfield 90 stores the IP address of the firewall proxy 20 to which the call agent 24 may address MGCP messages. More specifically, in the embodiment of FIG. 1 wherein the firewall proxy 20 and the call agent 24 are coupled to the Internet 12, the domain subfield 90 stores the public IP address of the firewall proxy 20. In the embodiment of FIG. 2 wherein the call agent is coupled to a local area network 16, the domain subfield 90 stores the private network IP address assigned to the private network interface 56*b* of the firewall proxy 20.

The NAT timer field 92 stores the NAT timer value which represents a time period during which the firewall proxy 20 is to send an MGCP message to the MTA using the public socket (stored in the public socket field 80) to assure that the UDP/IP channel established through the NAT firewall 18 remains open for exchanging MGCP messages.

Turning briefly to FIG. 9, an exemplary notified entity map 62 is shown. The notified entity map 62 comprises a plurality of records 96. Each record 96, associates an MTA endpoint ID (stored in an endpoint ID field 100) with a notified entity (stored in a notified entity field 106).

The MTA endpoint ID field 100 comprises a pattern subfield 102 and a domain subfield 104. The pattern subfield 102 stores the unique local endpoint name associated with the MTA and the domain subfield 104 stores the IP address assigned to the MTA.

The notified entity field 106 comprises a call agent IP address field 108 and a port number field 110 for storing the IP address and port number of the call agent 24 which is then currently providing call signaling services to the MTA.

Turning briefly to FIG. 10, an exemplary MTA original request map 64 is shown. The MTA original request map 64 comprises a plurality of records 112. Each record 112 associates a public socket (stored in a public socket field 114) with the message transaction ID value provided by the MTA (stored in a message transaction ID field 120) and the unique transaction ID generated by the transaction ID management module 44 of the proxy server 20 (stored in a MTAR transaction ID field 122).

The public socket field 114 comprises an IP address field 116 and a port number field 118. The IP address subfield 116 and the port number subfield 118 store the IP address and UDP port number, respectively, written to UDP source socket fields of a UDP header by the NAT firewall 18 supporting the MTA.

Turning briefly to FIG. 11, an exemplary proxy MTA request map 66 is shown. The proxy MTA request map 66 comprises a plurality of records 124. Each record 124 associates the unique transaction ID generated by the proxy server 20 (stored in an MTA request (MTAR) transaction ID field 126) with the message transaction ID value provided by the MTA (stored in a message transaction ID field 128) and the endpoint ID of the MTA (stored in an endpoint ID field 130).

The MTA endpoint ID field 130 comprises a pattern subfield 132 and a domain subfield 134. The pattern subfield 132 stores the unique local endpoint name associated with the MTA and the domain subfield 134 stores the IP address assigned to the MTA.

For purposes of describing the present invention, the MTA original request map 64 and the proxy MTA request map 66 are represented as separate tables. However, those skilled in the art will appreciate that the two tables may be combined into a single database table.

Turning briefly to FIG. 12, an exemplary call agent original request map 68 is shown. The call agent original request map 68 comprises a plurality of records 136. Each record 136 associates a call agent socket (stored in a call agent socket field 138) with the message transaction ID value provided by the call agent 24 (stored in a message transaction ID field 144) and the unique transaction ID generated by the proxy server 20 (stored in a call agent request (CAR) transaction ID field 146).

The call agent socket field 138 comprises an IP address subfield 140 and a port number subfield 142. The IP address subfield 140 and the port number subfield 142 store the IP address and UDP port number, respectively, from which the call agent 24 provides a UDP message.

Turning briefly to FIG. 13, an exemplary proxy call agent request map 70 is shown. The proxy call agent request map 70 comprises a plurality of records 148. Each record 148 associates the unique transaction ID generated by the proxy server 20 (stored in a CAR transaction ID field 150) with the call agent socket value (stored in a call agent socket field 152), an MGCP request type (stored in an MGCP request field 158), a session ID value (stored in a session ID value field 160), and the relay server resource 31 (stored in a relay server resource field 162).

The call agent socket field 152 comprises an IP address subfield 154 and a port number subfield 156. The IP address subfield 154 and the port number subfield 156 store the IP address and UDP port number, respectively, from which the call agent 24 provides a UDP message.

The relay server resource field 162 comprises an IP address subfield 164 and a port number subfield 166. The IP address subfield 164 and the port number subfield 166 store the IP address and UDP port number, respectively, of the relay server resource 31 assigned for relaying a real time media session by the CCCM relay server 22 (FIG. 1).

For purposes of describing the present invention, the call agent original request map 64 and the proxy call agent request map 66 are represented as separate tables. However, those skilled in the art will appreciate that the two tables may be combined into a single database table.

Figures 14, 15:
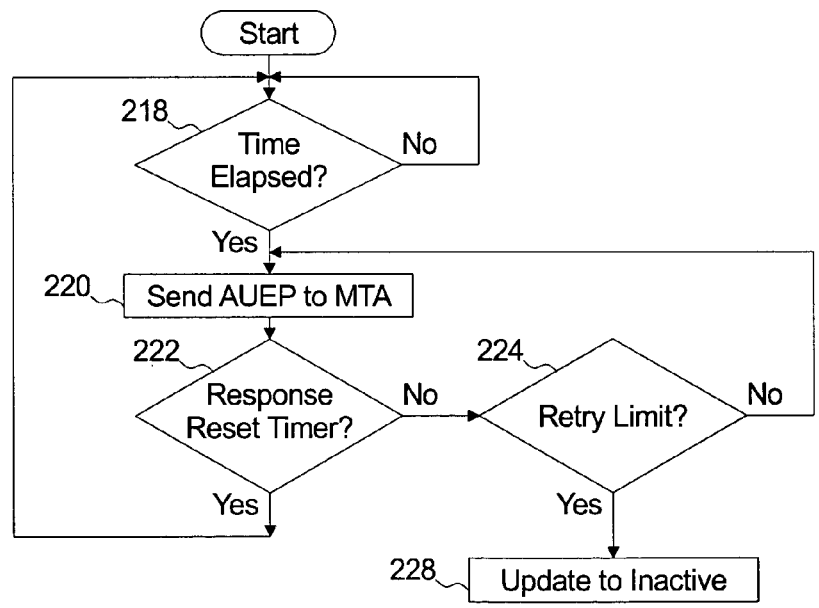
FIG. 14 represents an exemplary CCCM session description protocol (SDP) connection table in accordance with one embodiment of the present invention.
FIG. 15 is a flow chart representing exemplary operation of a NAT binding module of the firewall proxy in accordance with one embodiment of the present invention.

Turning briefly to FIG. 14, an exemplary CCCM connection map 72 is shown. The CCCM connection map 72 comprises a plurality of records 168. Each record 168 associates the endpoint ID of an MTA (stored in an endpoint ID field 170), with the session ID (stored in a session ID field 176), and the relay server resource 31 (stored in a relay server resource field 180).

The relay server resource field 180 comprises an IP address subfield 182 and a port number subfield 184. The IP address subfield 182 and the port number subfield 184 store the IP address and UDP port number of the relay server resource 31.

NAT Binding Module

The NAT binding module generally monitors the NAT timer field 92 of each record 96 in the registration table 60 for purposes of assuring that a message exchange with each private network MTA occurs frequently enough to prevent the NAT firewall from closing the UDP/IP channel (stored in the public socket field 80) that can be used for exchanging MGCP messages with the MTA.

The flow chart of FIG. 15 represents an exemplary process operated by the NAT binding module 46 for each active private network MTA. The NAT binding module 46 continually checks the NAT timer value stored in the NAT timer field 92 of the registration table 60. This occurs until such time as a predetermined time period has elapsed (such as if the then current time is equal to or greater than the NAT timer value—or if the then current time is greater than the NAT timer value by a predetermined amount). When the predetermined time period has elapsed, as represented by the decision box 218, the NAT binding module calls or otherwise passes control to the firewall proxy work thread module 52, at step 220, for the purposes of sending an audit endpoint (AUEP) message to the MTA.

Step 222 represents determining whether a response has reset the timer value in the NAT timer field 92 within a predetermined time out period during which a response to the AUEP message would be expected to be received.

As will be discussed in more detail herein, receipt of a message from the MTA will cause the firewall proxy work thread module 52 to generate a call to update the source IP address and port number stored in the public socket field 80 of a record 96 associated with a MTA and to update the NAT timer value stored in the NAT timer field 92. If such an event has occurred at decision box 222, the NAT binding module returns to step 218 to await expiration of the updated timer value.

Alternatively, if the timer value is not reset due to a message received from the MTA at step 222, the NAT binding module 46 determines whether a predetermined retry limit has been reached at step 224. If not, step 220 is again performed to initiate another AUEP message to the MTA. If the retry limit has been exceeded, the status of the MTA, as stored in the status field 94 is updated to inactive.

MGCP Endpoint Management Module

The MGCP endpoint management module 50 generally reads and writes applicable data to the registration table 60 and the notified entity map 62 when calls are received from the work thread module 52 to read or write MGCP endpoint information.

MGCP Transaction Management Module

The MGCP transaction management module 48 generally reads and writes applicable data to the MTA original request map 64, the proxy MTA request map 66, the call agent original request map 68, the proxy call agent request map 70, and the CCCM connection map 72 when calls are received from the work thread module 52 to read or write MGCP message translation information.

Firewall Proxy Work Thread Module

The firewall proxy work thread module 52 generally: i) receives each MGCP message addressed to the firewall proxy 20 from the message queue 54—including MGCP messages address to the public IP address of the public network interface 56a and MGCP messages address to the private IP address of the private network interface 56b; ii) makes processing calls to each of the transaction ID management module 44, the NAT binding module 46, the MGCP transaction management module 48, and the MGCP endpoint management module 50 to appropriately write data to the various tables and maps of the database 42 and obtain data there from; and iii) translates each message for delivery to the message queue 54 and subsequent forwarding to the destination.

The diagram of FIG. 30 represents exemplary MGCP fields which are translated by the firewall proxy 20. More specifically, each MGCP message translated by the firewall proxy includes at least a portion of the exemplary MGCP fields shown in the exemplary MGCP message 500 of FIG. 30.

The exemplary message 500 comprises IP and UDP headers 502 which in combination includes a source socket 506 (e.g. the UDP/IP source IP address and port number); a destination socket 508 (e.g. the UDP/IP destination IP address and port number), and other UDP/IP headers 510.

The message further comprises exemplary MGCP message fields 504 which include: i) an endpoint ID field 512 including a pattern subfield 512a identifying the MTA by its local endpoint name and a domain subfield 512b; ii) a transaction ID field 514; one or more ResponseACK fields 516; iii) a notified entity parameter field 518; and iv) other MGCP message fields 530.

Figure 16:
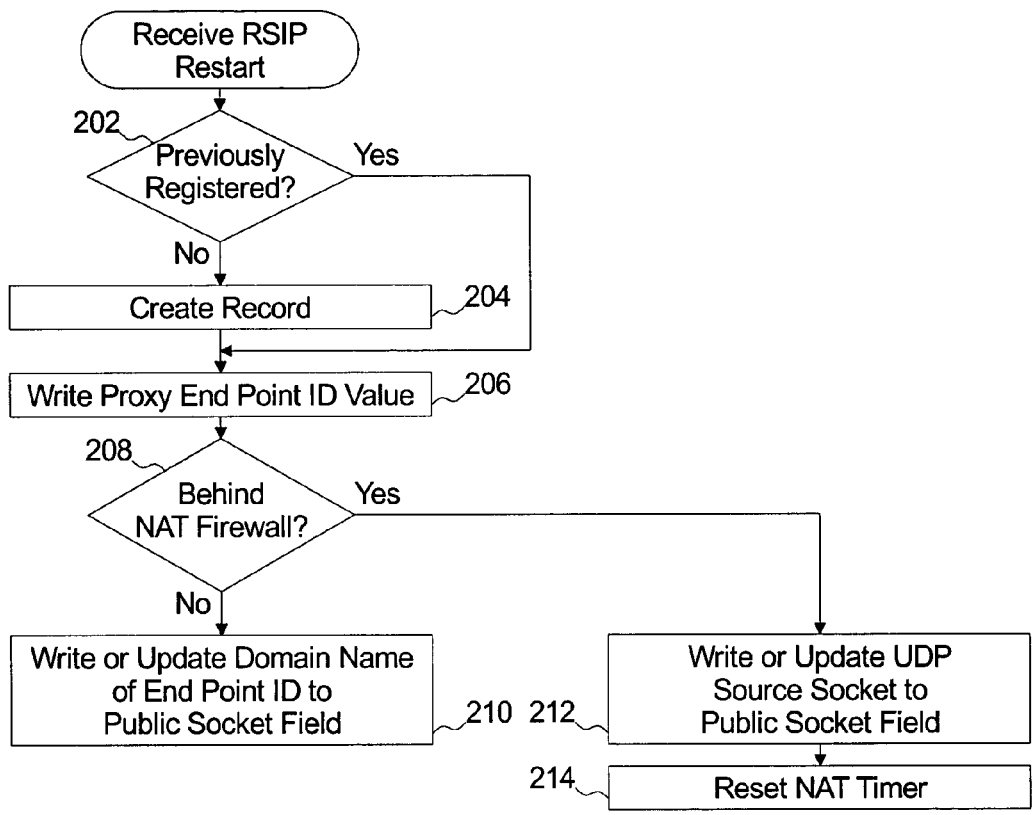
FIG. 16 is a flow chart representing exemplary operation of a firewall proxy work thread module of the firewall proxy in accordance with one embodiment of the present invention.

The flow chart of FIG. 16 represents endpoint management steps for registering the MTA with the firewall proxy 20. Such steps are performed by the firewall proxy work thread module 52 upon receipt of a RSIP restart message from an MTA.

Step 202 represents determining whether the MTA was previously registered with the call agent 24 through the firewall proxy 20 by comparing the endpoint ID, or at least the local endpoint name portion of the endpoint ID (from the endpoint ID field 512) within the RSIP message to the endpoint ID field 74 of each record 96 of the registration table 60 (FIG. 8). If the MTA has not been previously registered, a new record 96 is created at step 204 and the endpoint ID from the message is written to the MTA endpoint ID field 74.

At step 206, a proxy endpoint ID is generated and written to the proxy endpoint ID field 86. More specifically, the local endpoint name of the proxy endpoint ID (written to field 88) will be the same unique local endpoint name as retrieved from the pattern field 512a of the message. The domain name portion of the proxy endpoint ID value (written to field 90) will be the IP address assigned to the network interface 56a or 56b which is used to communicate with the call agent 24.

Step 208 represents determining whether the MTA is behind a NAT firewall. More specifically, step 208 represents comparing the source IP address (from the source socket 506) of the UDP/IP header 502 with the domain name portion of the endpoint ID included in the message. If the two are the same, the message has not undergone NAT translation and the MTA is a public network MTA. Alternatively, if the two are different, the message has undergone NAT translation and the MTA is a private network MTA.

If the MTA is a private network MTA then, at step 212, the IP address and port number of the source socket 506 is written to the IP address field subfield 82 and the port number subfield 84 of the public socket field 80 of the registration table 60.

Step 214 represents writing a NAT timer value to the NAT timer field 92. The NAT timer value represents a time period during which a message exchange with the private network MTA should occur to prevent the NAT firewall from closing the UDP/IP channel available for sending MGCP messages to the MTA.

The flow chart of FIG. 17 represents exemplary transaction management steps for forwarding the RSIP restart message to the call agent 24. Such steps are performed by the firewall proxy work thread module 52 upon receipt of an RSIP restart message from an MTA.

Step 234 represents determining whether the RSIP message is a resend of a previous RSIP message. In the event that a response to an RSIP message is not received within a predetermined period of time, the MTA may resend the RSIP message using the same transaction ID value. Therefore, at step 234, the firewall proxy work thread module 52 can determine whether the RSIP message is a resend by comparing the transaction ID in the transaction ID field 514 with those stored in the transaction ID field 120 of each record 112 of the MTA original request map 64 (FIG. 10).

If the RSIP message is not a resend, a unique transaction ID (e.g. an MTAR transaction ID) is allocated to the message at step 236 by making a processing call to the transaction ID management module 44. Step 238, represents writing a new record 112 to the MTA original request map 64 (FIG. 10) and a new record 124 to the proxy MTA request map 66 (FIG. 11) corresponding to the message.

Steps 242 through 250 then represent steps for translating the RSIP message using either the previously allocated MTAR transaction ID if the message is a resend or using the newly allocated MTAR transaction ID if the message is original. More specifically, at step 242 the firewall proxy work thread module 52 will replace the message transaction ID assigned by the MTA in the transaction ID field 514 with the MTAR transaction ID.

Step 244 represents replacing each transaction ID within the ResponseACK field(s) 516 of the RSIP message with the corresponding CAR transaction ID from the call agent original request map 68 (FIG. 12).

Step 246 represents replacing the domain name portion of the endpoint ID in the domain subfield 512a of the RSIP message with the IP address assigned to the network interface 56a or 56b through which the proxy server 20 communicates with the call agent 24.

Step 248 represents sending the translated RSIP message to the call agent associated with the MTA in the notified entity map 62. Because resetting of the NAT timer value is included as an endpoint management step in FIG. 16, it is not necessary to include such a step in transaction management steps of FIG. 17.

Figure 18:
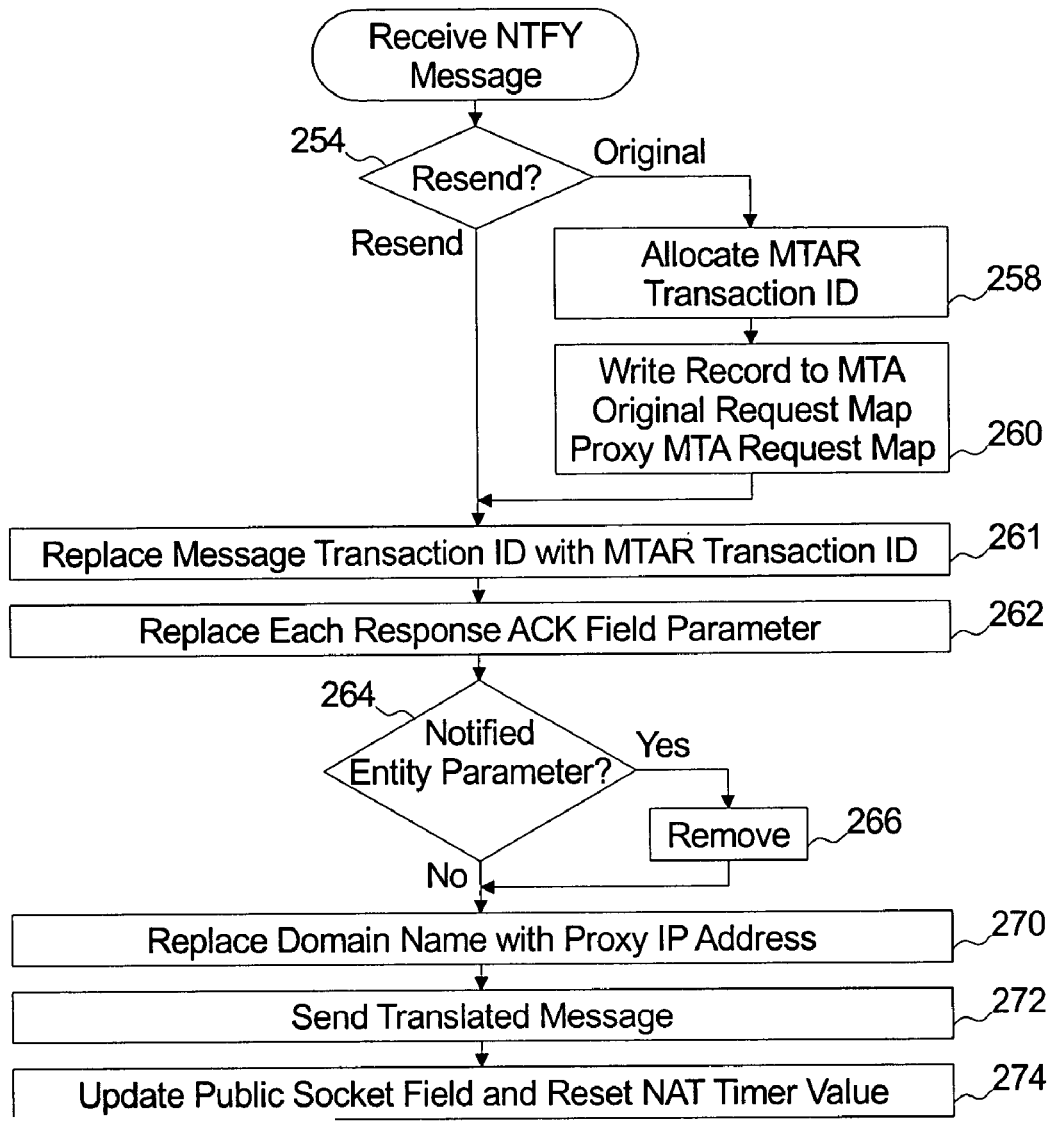
FIG. 18 is a flow chart representing exemplary operation of a firewall proxy work thread module of the firewall proxy in accordance with one embodiment of the present invention.

The flow chart of FIG. 18 represents exemplary operation of the firewall proxy work thread module 52 upon receipt of a NTFY message from an MTA.

Step 254 represents determining whether the message is a resend of a previous NTFY message. Again, in the event that a response is not received within a predetermined period of time, the MTA may resend a NTFY message using the same transaction ID. Therefore, at step 254, the transaction management module compares the transaction ID in the transaction ID field 514 to those stored in the MTA original request map 64 (FIG. 10) to determine whether the NTFY message is a resend.

If the NTFY message is not a resend, a unique MTAR transaction ID is allocated to the message at step 258 by making a processing call to the transaction ID management module 44. Step 260 represents writing a new record 112 to the MTA original request map 64 (FIG. 10) and a new record 124 to the proxy MTA request map 66 (FIG. 11) corresponding to the message.

Steps 261 through 274 represent steps for translating the NTFY message using either the previously allocated MTAR transaction ID if the message is a resend or using the newly allocated MTAR transaction ID if the message is original. More specifically, at step 261, the firewall proxy work thread module 52 will replace the message transaction ID assigned by the MTA in the transaction ID field 514 with the MTAR transaction ID.

Step 262 represents replacing each transaction ID within the ResponseACK field(s) 516 of the RSIP message with the corresponding CAR transaction ID from the call agent original request map 68 (FIG. 12).

Step 264 represents determining whether the message includes a notified entity parameter 518. If yes, such parameter 518 is removed at step 266.

Step 270 represents replacing the domain name portion of the endpoint ID in the domain subfield 512a of the message with the IP address assigned to the network interface 56*a* or 56*b* through which the proxy server 20 communicates with the call agent 24.

Step 272 represents sending the translated message to the call agent associated with the MTA in the notified entity map 62 and step 274 represents updating the public socket field 80 of the registration table 60 and resetting the NAT timer value. More specifically, the public socket field 80 is updated to reflect the source socket of the message—as assigned by the NAT firewall 18 if the MTA is a private network MTA.

Figure 19:
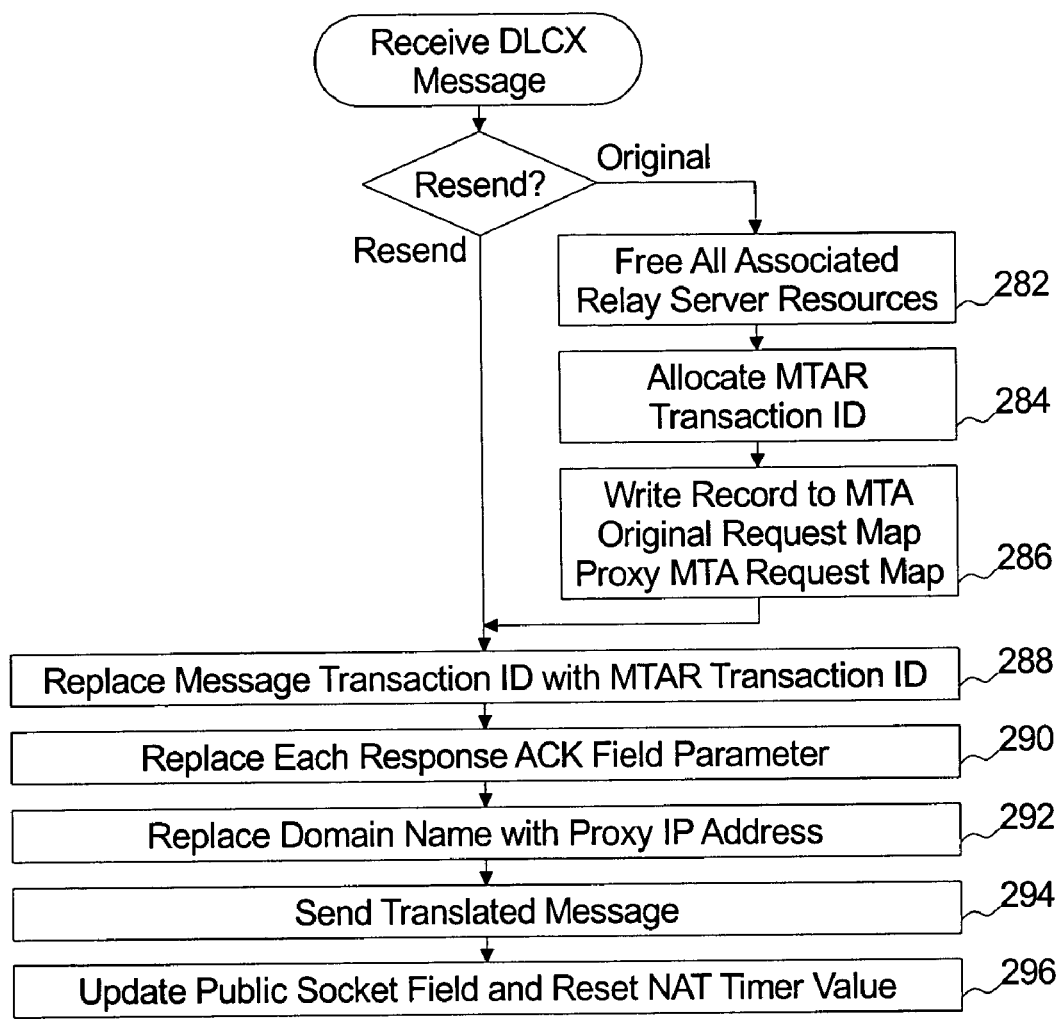
FIG. 19 is a flow chart representing exemplary operation of a firewall proxy work thread module of the firewall proxy in accordance with one embodiment of the present invention.

The flow chart of FIG. 19 represents exemplary operation of the firewall proxy work thread module 52 upon receipt of a DLCX message from an MTA.

Step 278 represents determining whether the message is a resend of a previous message (based on a time out in not receiving a response at the MTA). Again, in the event that a response is not received within a predetermined period of time, the MTA may resend a DLCX message using the same transaction ID. Therefore, at step 278, the transaction management module compares the transaction ID in the transaction ID field 514 (FIG. 30) to those stored in the MTA original request map 64 (FIG. 10) to determine whether the DLCX message is a resend.

If the DLCX message is not a resend: i) all relay server resources 31 associated with the MTA are freed at step 282 (e.g. the records associated with the MTA are removed from the CCCM connection map 72); and ii) a unique MTAR transaction ID is allocated to the message at step 284 by making a processing call to the transaction ID management module 44.

Step 286 represents writing a record 112 to the MTA original request map 64 (FIG. 10) and a record 124 to the proxy MTA request map 66 (FIG. 11) corresponding to the message.

Steps 288 through 290 represent steps for translating the DLCX message using either the previously allocated MTAR transaction ID if the message is a resend or using the newly allocated MTAR transaction ID if the message is original. More specifically, at step 288, the firewall proxy work thread module 52 will replace the message transaction ID assigned by the MTA in the transaction ID field 514 with the MTAR transaction ID.

Step 290 represents replacing each transaction ID within the ResponseACK field(s) 516 of the RSIP message with the corresponding CAR transaction ID from the call agent original request map 68 (FIG. 12).

Step 292 represents replacing the domain name portion of the endpoint ID in the domain subfield 512*a* of the message with the IP address assigned to the network interface 56*a* or 56*b* through which the proxy server 20 communicates with the call agent 24.

Step 294 represents sending the translated message to the call agent associated with the MTA in the notified entity map 62 and step 296 represents updating the public socket field 80 of the registration table 60 and resetting the NAT timer value.

Figure 20:
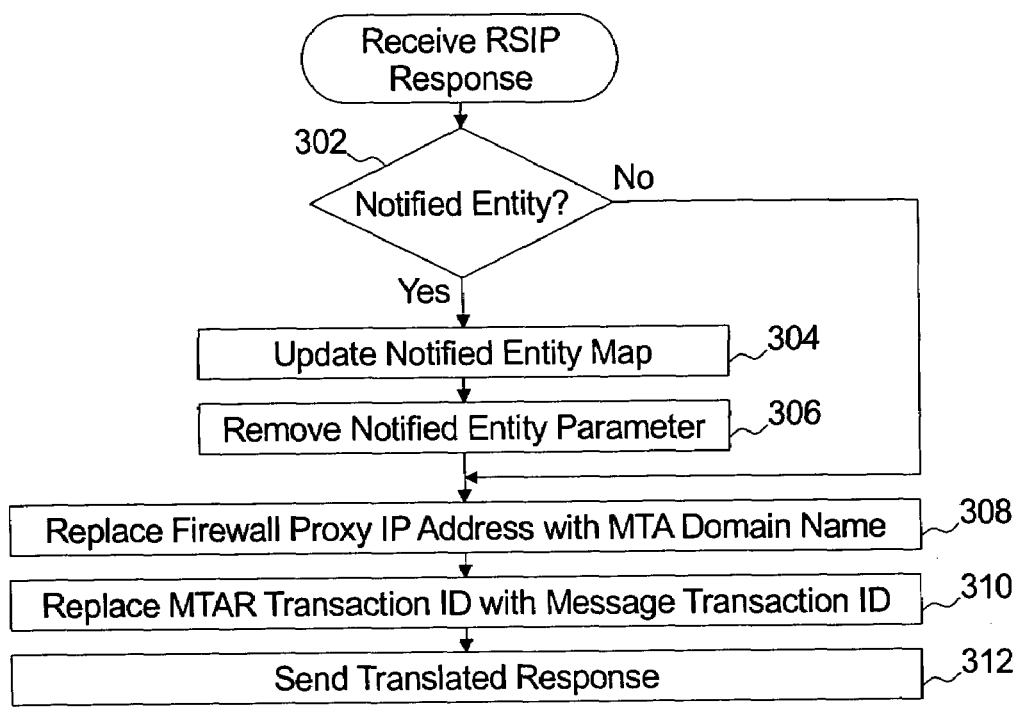
FIG. 20 is a flow chart representing exemplary operation of a firewall proxy work thread module of the firewall proxy in accordance with one embodiment of the present invention.

The flow chart of FIG. 20 represents exemplary operation of the firewall proxy work thread module 52 upon receipt of a response from a call agent 24 to a translated RSIP message (forwarded to the call agent 24 in accordance with the flow chart of FIG. 17).

Step 302 represents determining whether the response message includes a notified entity parameter 518. If yes, the records 98 associated with the MTA in the notified entity map 62 (FIG. 9) are updated at step 304 and the notified entity parameter 518 is removed from the response message at step 306. If there is no notified entity parameter 518 in the response message, steps 304 and 306 are skipped.

Step 308 represents looking up the endpoint ID 512 that corresponds to the MTAR transaction ID in the proxy MTA Request map 66 (FIG. 11) and replacing the IP address of the firewall proxy 20 in the domain name portion of the endpoint ID of the response message with the domain name of the endpoint ID of the MTA as stored in the endpoint ID field 130 of the proxy MTA request map 66.

Step 310 represents looking up the transaction ID (in the MTA request transaction ID field 128) which corresponds to the MTAR transaction ID of the response message in the proxy MTA Request map 66 and replacing the MTAR transaction ID in the response message with the transaction ID. Step 312 represents sending the translated response message to the call agent 24.

Figure 21:
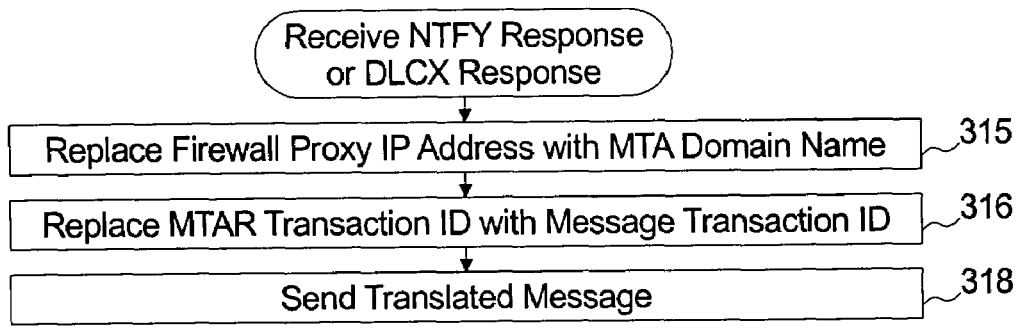
FIG. 21 is a flow chart representing exemplary operation of a firewall proxy work thread module of the firewall proxy in accordance with one embodiment of the present invention.

The flow chart of FIG. 21 represents exemplary operation of the firewall proxy work thread module 52 upon receipt of a response from a call agent 24 to a translated NTFY or DLCX message (forwarded to the call agent 24 in accordance with the flow charts of FIG. 18 and FIG. 19).

Step 315 represents looking up the endpoint ID that corresponds to the MTAR transaction ID in the proxy MTA Request map 66 (FIG. 11) and replacing the IP address of the firewall proxy 20 in the domain name portion of the endpoint ID of the response message with the domain name of the endpoint ID of the MTA as stored in the endpoint ID field 130 of the proxy MTA request map 66.

Step 316 represents looking up the transaction ID (in the MTA request transaction ID field 128) which corresponds to the MTAR transaction ID of the response message in the proxy MTA Request map 66 and replacing the MTAR transaction ID in the response message with the transaction ID. Step 318 represents sending the translated response message to the MTA.

Figure 22:
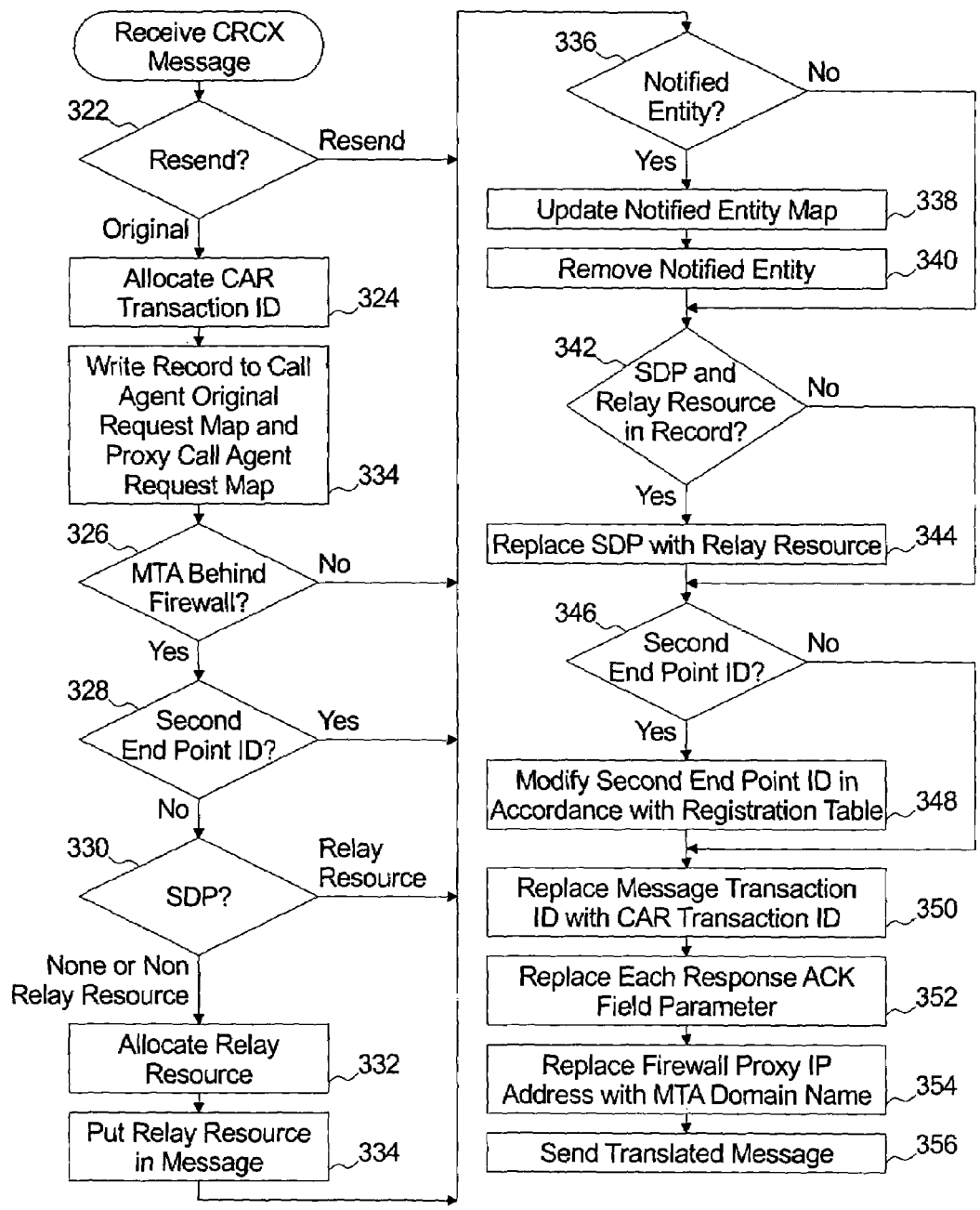
FIG. 22 is a flow chart representing exemplary operation of a firewall proxy work thread module of the firewall proxy in accordance with one embodiment of the present invention.

FIG. 22 represents exemplary operation of the firewall proxy work thread module 52 upon receipt of a CRCX message from the call agent 24.

Step 322 represents determining whether the message is a resend of a previous CRCX message. In the event that the call agent 24 does not receive a response to a MGCP message within a predetermined period of time, the call agent 24 may resend the message using the same transaction ID. Therefore, at step 322, the transaction management module compares the transaction ID to those stored in the call agent original request map 68 (FIG. 12) to determine whether the message is a resend.

If the message is not a resend, steps 324 through 334 are performed. At step 324, a unique transaction ID (e.g. a CAR transaction ID) is allocated to the message at step 324 by making a processing call to the transaction ID management module 44.

Step 325 represents writing a record 136 to the call agent original request map 68 (FIG. 12) and a record 148 to the proxy call agent request map 70 (FIG. 13) corresponding to the message.

Step 326 represents determining whether the MTA to which the CRCX message is addressed is behind a NAT firewall, step 328 represents determining whether there is a second endpoint ID field in the CRCX message (e.g. indicating that the two MTAs are behind the same NAT firewall), and step 330 represents determining whether the SDP fields of the CRCX message represent a relay server resource 31.

In the event that the MTA is behind a NAT firewall, there is no second endpoint ID parameter, and the SDP channel is not that of a relay server resource 31, then an SDP request message is sent to the CCCM relay server 22 to obtain a relay server resource 31. At step 334, the IP address and port number of the SDP channel of the CRCX message is replaced with the newly allocated relay server resource 31. Otherwise, the SDP channel of the CRCX message is not modified.

Step 336 represents determining whether the CRCX message includes a notified entity parameter. If yes, the records 98 of the notified entity map 62 (FIG. 9) associated with the MTA are updated at step 338 and the notified entity parameter is removed from the message at step 340. If there is no notified entity parameter in the message, steps 338 and 340 are skipped.

Step 342 represents determining whether both: i) the message includes an SDP channel; and ii) a relay server resource 31 exist in a record 168 of the CCCM connection table 72 (FIG. 14) which associates with the session ID. If both conditions are met, the SDP channel of the message is replaced with the relay server resource 31. Otherwise, step 344 is skipped.

Step 346 represents determining whether the CRCX message includes a second endpoint ID parameter. If yes, the second endpoint ID is modified in accordance with the registration table 60 at step 348. Otherwise, step 348 is skipped.

Step 350 represents replacing the message transaction ID with the CAR transaction ID—either the previously allocated CAR transaction ID if the message is a resend or using the newly allocated CAR transaction ID if the message is original.

Step 352 represents replacing each transaction ID within the ResponseACK field(s) 516 of the RSIP message with the corresponding CAR transaction ID from the call agent original request map 68 (FIG. 12).

Step 354 represents looking up the endpoint ID that corresponds to the MTA and replacing the IP address of the firewall proxy 20 in the domain name portion of the endpoint ID of the message with the domain name of the endpoint ID of the MTA as stored in the endpoint ID field 70 of the MTA registration map 60 (FIG. 8). Step 356 represents sending the translated message to the MTA.

Figure 23:
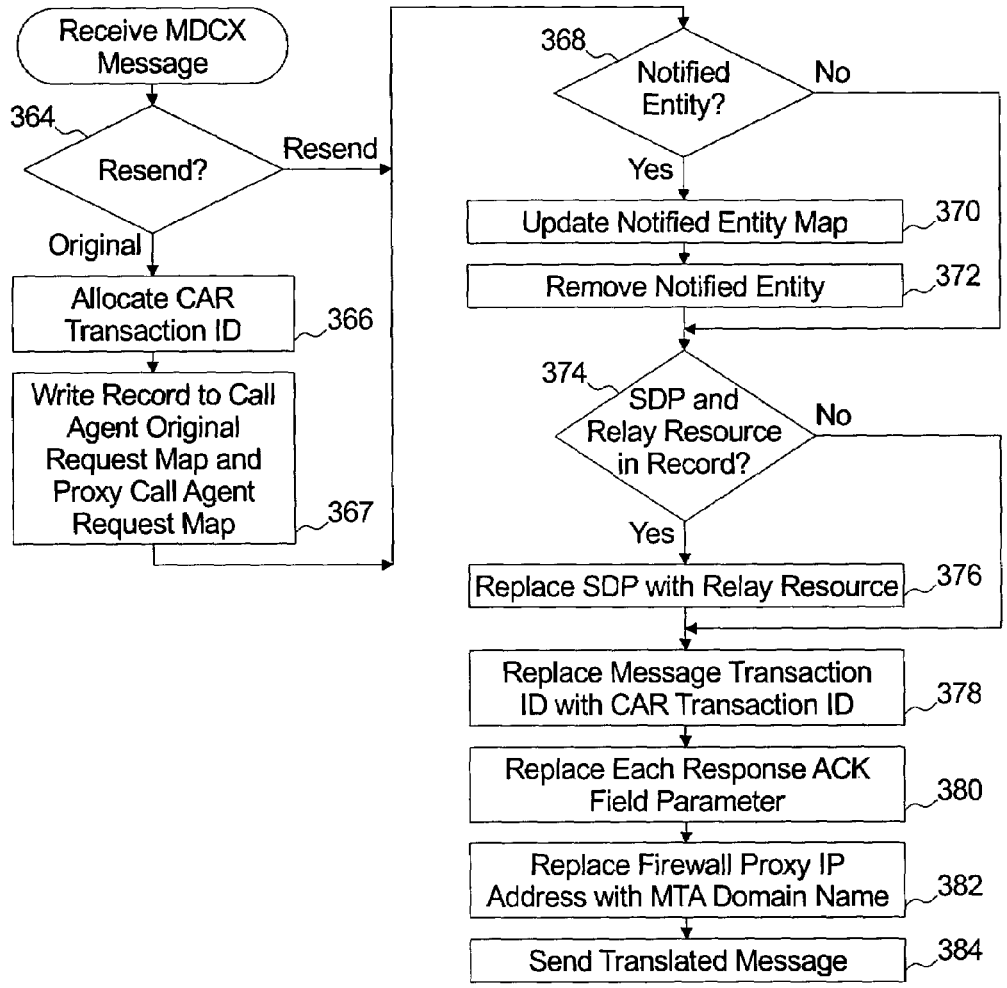
FIG. 23 is a flow chart representing exemplary operation of a firewall proxy work thread module of the firewall proxy in accordance with one embodiment of the present invention.

FIG. 23 represents exemplary operation of the firewall proxy work thread module 52 upon receipt of a MDCX message from the call agent 24.

Step 364 represents determining whether the message is a resend of a previous MDCX message. Again, in the event that the call agent 24 does not receive a response to an MGCP message within a predetermined period of time, the call agent 24 may resend the message using the same transaction ID. Therefore, at step 364, the transaction management module compares the transaction ID of the message to those stored in the call agent original request map 68 (FIG. 12) to determine whether the message is a resend.

If the message is not a resend, steps 366 and 367 are performed. At step 366, a unique CAR transaction ID is allocated to the message by making a processing call to the transaction ID management module 44.

Step 367 represents writing a record 136 to the call agent original request map 68 (FIG. 12) and a record 148 to the proxy call agent request map 70 (FIG. 13) corresponding to the message.

Step 368 represents determining whether the MDCX message includes a notified entity parameter. If yes, the records 98 of the notified entity map 62 (FIG. 9) associated with the MTA are updated at step 370 and the notified entity parameter is removed from the message at step 372. If there is no notified entity parameter in the message, steps 370 and 372 are skipped.

Step 374 represents determining whether both: i) the message includes an SDP channel; and ii) a relay server resource 31 exists in a record 168 of the CCCM connection table 72 (FIG. 14) which associated with the session ID. If both conditions are met, the SDP channel of the message is replaced with the relay server resource 31 at step 376. Otherwise, step 376 is skipped.

Step 378 represents replacing the message transaction ID with the CAR transaction ID—either the previously allocated CAR transaction ID if the message is a resend or using the newly allocated CAR transaction ID if the message is original.

Step 380 represents replacing each transaction ID within the ResponseACK field(s) 516 of the RSIP message with the corresponding CAR transaction ID from the call agent original request map 68 (FIG. 12).

Step 382 represents looking up the endpoint ID that corresponds to the MTA and replacing the IP address of the firewall proxy 20 in the domain name portion of the endpoint ID of the message with the domain name of the endpoint ID of the MTA as stored in the endpoint ID field 70 of the MTA registration map 60 (FIG. 8).

Step 384 represents sending the translated message to the MTA.

Figure 24:
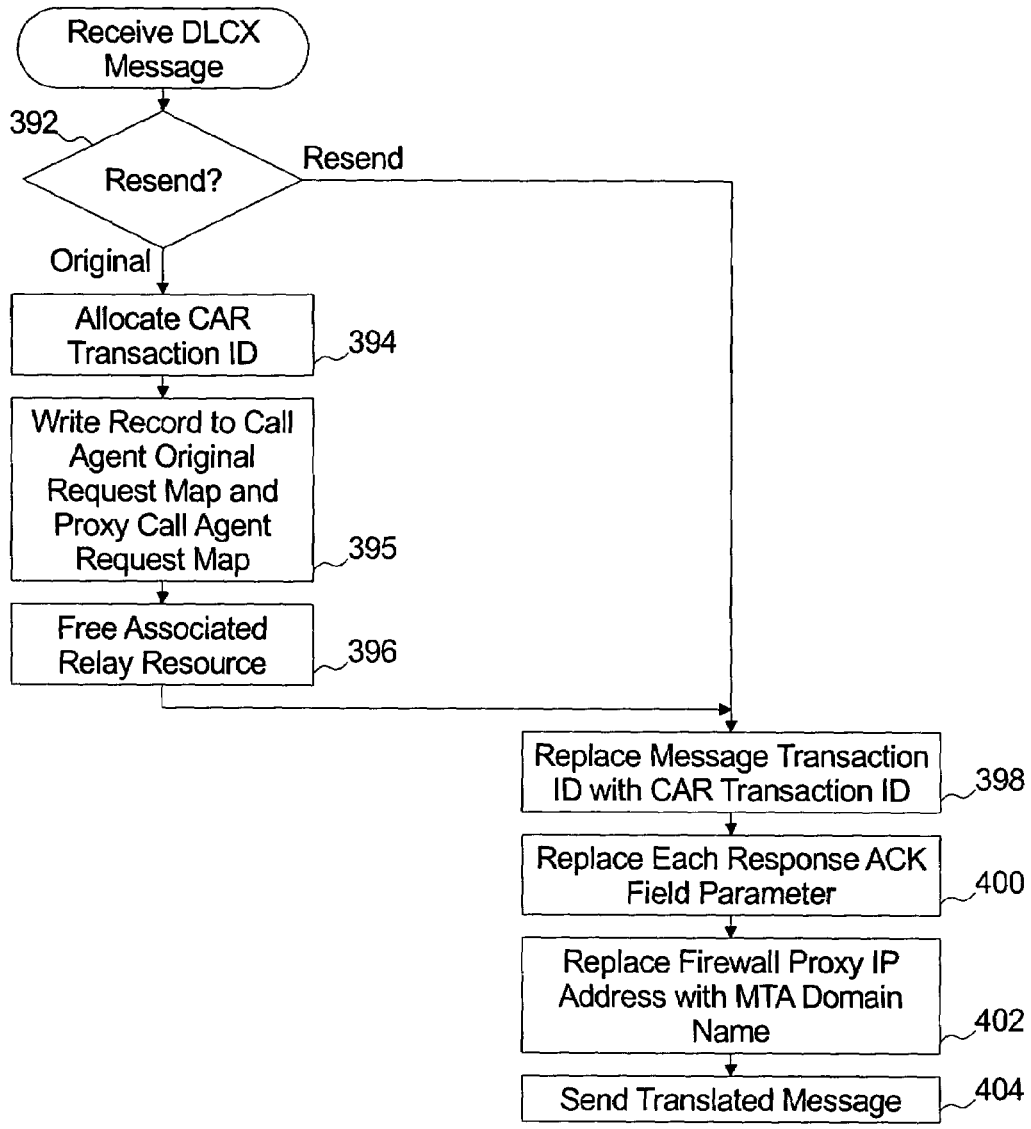
FIG. 24 is a flow chart representing exemplary operation of a firewall proxy work thread module of the firewall proxy in accordance with one embodiment of the present invention.

FIG. 24 represents exemplary operation of the firewall proxy work thread module 52 upon receipt of a DLCX message from the call agent 24.

Step 392 represents determining whether the message is a resend of a previous DLCX message. Again, in the event that the call agent 24 does not receive a response to an MGCP message within a predetermined period of time, the call agent 24 may resend the message using the same transaction ID. Therefore, at step 392, the transaction management module compares the transaction ID of the message to those stored in the call agent original request map 68 (FIG. 12) to determine whether the message is a resend.

If the message is not a resend, steps 394, 395, and 396 are performed. At step 394, a unique CAR transaction ID is allocated to the message by making a processing call to the transaction ID management module 44.

Step 395 represents writing a record 136 to the call agent original request map 68 (FIG. 12) and a record 148 to the proxy call agent request map 70 (FIG. 13) corresponding to the message.

Step 396 freeing all relay server resources 31 associated with the MTA—which comprises removing the records 168 of the CCCM connection table 72 (FIG. 14) which are associated with the MTA.

Step 398 represents replacing the message transaction ID with the CAR transaction ID—either the previously allocated CAR transaction ID if the message is a resend or using the newly allocated CAR transaction ID if the message is original.

Step 400 represents replacing each transaction ID within the ResponseACK field(s) 516 of the RSIP message with the corresponding CAR transaction ID from the call agent original request map 68 (FIG. 12).

Step 402 represents looking up the endpoint ID that corresponds to the MTA and replacing the IP address of the firewall proxy 20 in the domain name portion of the endpoint ID of the message with the domain name of the endpoint ID of the MTA as stored in the endpoint ID field 70 of the MTA registration map 60 (FIG. 8). Step 404 represents sending the translated message to the MTA.

Figure 25:
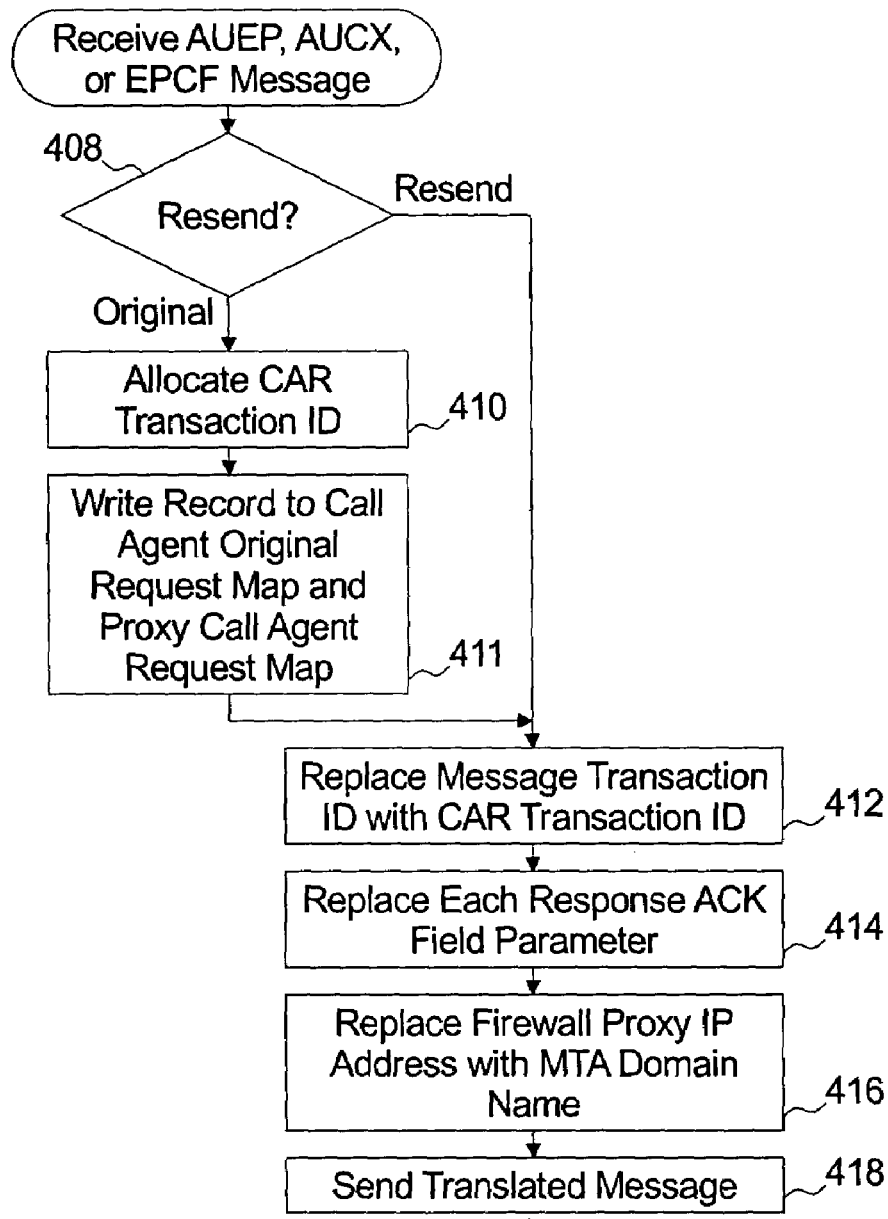
FIG. 25 is a flow chart representing exemplary operation of a firewall proxy work thread module of the firewall proxy in accordance with one embodiment of the present invention.

FIG. 25 represents exemplary operation of the firewall proxy work thread module 52 upon receipt of an AUEP, AUCX, or EPCF message from the call agent 24.

Step 408 represents determining whether the message is a resend of a previous message. Again, in the event that the call agent 24 does not receive a response to an MGCP message within a predetermined period of time, the call agent 24 may resend the message using the same transaction ID. Therefore, at step 408, the transaction management module compares the transaction ID of the message to those stored in the call agent original request map 68 (FIG. 12) to determine whether the message is a resend.

If the message is not a resend, steps 410 and 411 are performed. At step 410, a unique CAR transaction ID is allocated to the message by making a processing call to the transaction ID management module 44.

Step 411 represents writing a record 136 to the call agent original request map 68 (FIG. 13) and a record 148 to the proxy call agent request map 70 (FIG. 13) corresponding to the message.

Step 412 represents replacing the message transaction ID with the CAR transaction ID—either the previously allocated CAR transaction ID if the message is a resend or using the newly allocated CAR transaction ID if the message is original.

Step 414 represents replacing each transaction ID within the ResponseACK field(s) 516 of the RSIP message with the corresponding CAR transaction ID from the call agent original request map 68 (FIG. 12).

Step 416 represents looking up the endpoint ID that corresponds to the MTA and replacing the IP address of the firewall proxy 20 in the domain name portion of the endpoint ID of the message with the domain name of the endpoint ID of the MTA as stored in the endpoint ID field 70 of the MTA registration map 60 (FIG. 8).

Step 418 represents sending the translated message to the MTA.

Figure 26:
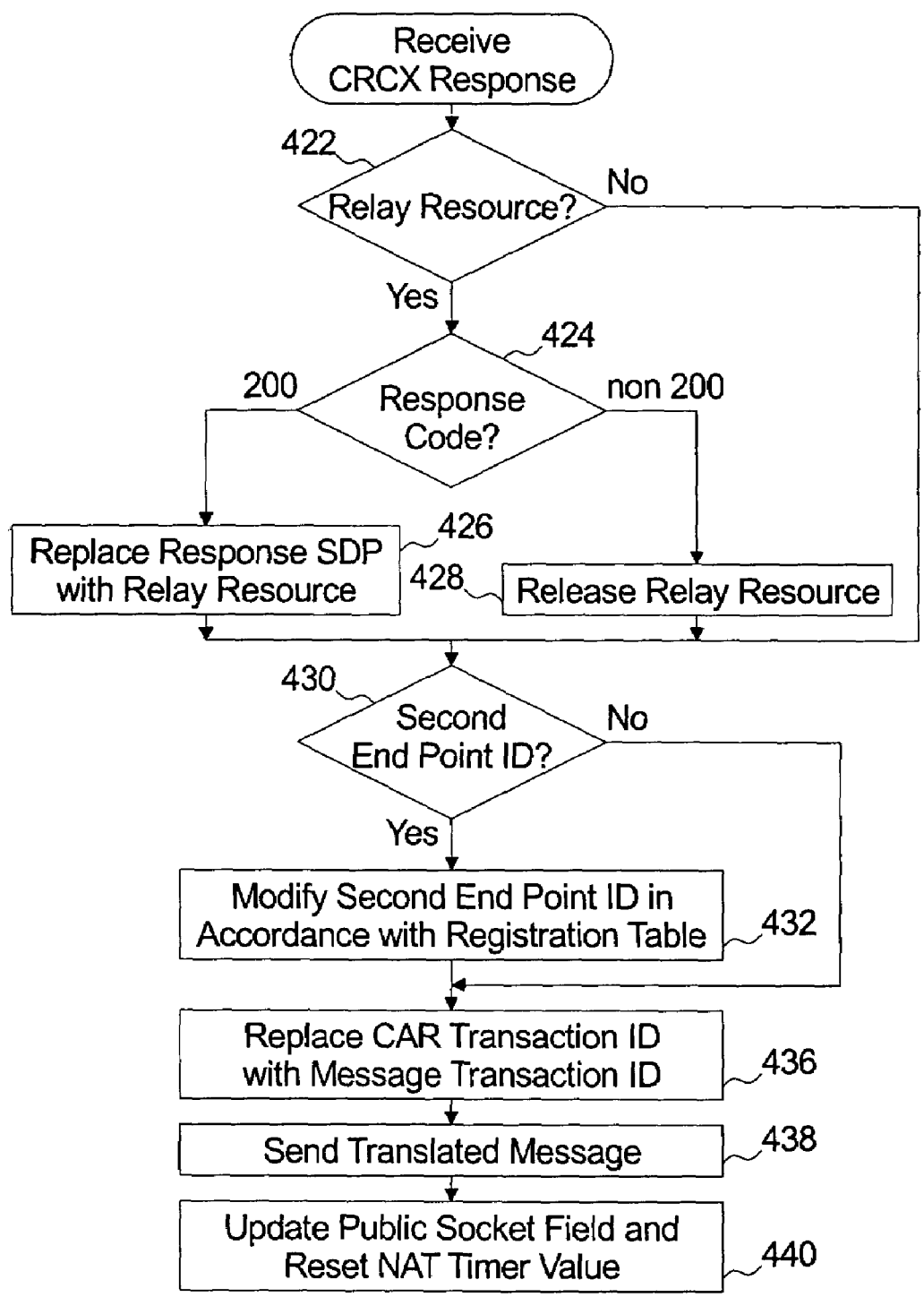
FIG. 26 is a flow chart representing exemplary operation of a firewall proxy work thread module of the firewall proxy in accordance with one embodiment of the present invention.

The flow chart of FIG. 26 represents exemplary operation of the firewall proxy work thread module 52 upon receipt of a response from an MTA 14 to a translated CRCX message (forwarded to the MTA 14 in accordance with the flow chart of FIG. 22).

Step 422 represents determining whether a record 168 in the CCCM connection table 72 (FIG. 14) associates the session ID of the response message with a relay server resource 31. If yes, it is determined whether the response code of the response message indicates successful completion (e.g. Response Code of 200) or unsuccessful full completion (e.g. Response code of non-200) at step 424. If the response code is 200, the SDP channel of the response message is replaced with the relay server resource 31 at step 426. If the response code is non-200, the relay server resource 31 is released and the record removed from the CCCM connection table 72 at step 428.

If at step 422, the session ID of the response is not associated with a relay server resource 31, steps 424, 426, and 428 are skipped. Step 430 represents determining whether the response message includes a second endpoint ID field. If it does, the second endpoint ID field is modified in accordance with the registration table 60 at step 432 (e.g. the domain name portion of the second endpoint ID is replaced with the domain name of the MTA identified by the pattern portion of the second endpoint ID). If the response message does not include a second endpoint ID, step 432 is stepped.

Step 436 represents looking up the transaction ID which corresponds to the CAR transaction ID in the proxy call agent request map 70 and replacing the CAR transaction ID in the response message with the transaction ID.

Step 438 represents sending the translated response message to the call agent and step 440 represents updating the public socket field 80 of the registration table 60 and resetting the NAT timer value.

Figure 27:
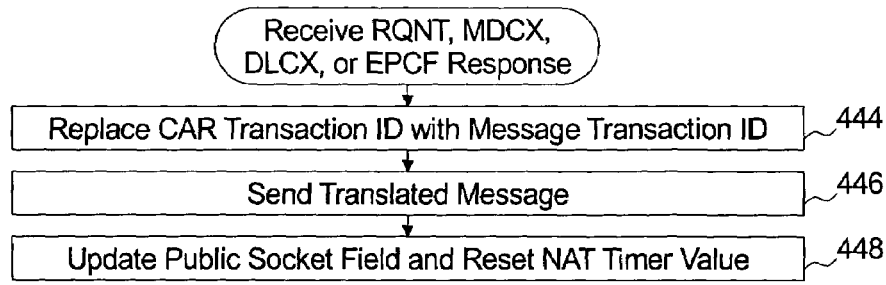
FIG. 27 is a flow chart representing exemplary operation of a firewall proxy work thread module of the firewall proxy in accordance with one embodiment of the present invention.

The flow chart of FIG. 27 represents exemplary operation of the firewall proxy work thread module 52 upon receipt of a response from an MTA 14 to a translated RQNT, MDCX, DLCX, or EPCF message.

Step 444 represents looking up the transaction ID which corresponds to the CAR transaction ID in the proxy call agent request map 70 and replacing the CAR transaction ID in the response message with the transaction ID.

Step 446 represents sending the translated response message to the call agent and step 448 represents updating the public socket field 80 of the registration table 60 and resetting the NAT timer value.

Figure 28:
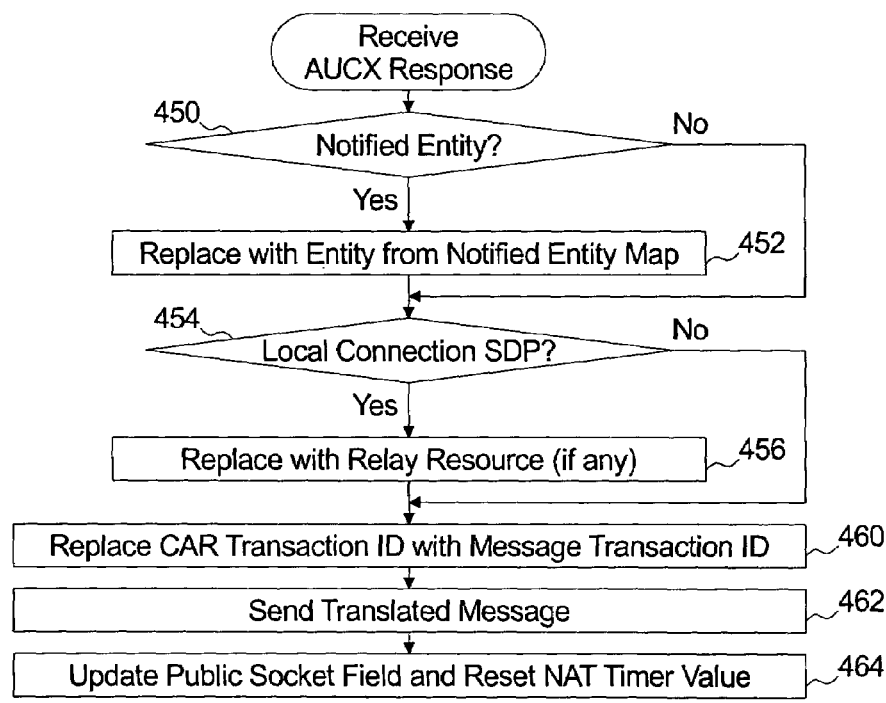
FIG. 28 is a flow chart representing exemplary operation of a firewall proxy work thread module of the firewall proxy in accordance with one embodiment of the present invention.

The flow chart of FIG. 28 represents exemplary operation of the firewall proxy work thread module 52 upon receipt of a response from an MTA 14 to a translated AUCX message.

Step 450 represents determining whether a notified entity parameter exists in the response message. If yes, the notified entity parameter is replaces with the entity corresponding thereto in the notified entity map 62 (FIG. 9) at step 452.

Step 454 represents determining whether the response message includes a local entity SDP (e.g. and SDP of a local connection created by the MTA). If yes, the SDP of the response message is replaced with a relay server resource 31 corresponding to the local entity SDP if one exists in the relay server resource 31 of the CCCM connection table 72. If at step 454, the response message does not include a local entity SDP, step 456 is skipped.

Step 460 represents looking up the transaction ID which corresponds to the CAR transaction ID in the proxy call agent request map 70 and replacing the CAR transaction ID in the response message with the transaction ID.

Step 462 represents sending the translated response message to the call agent and step 464 represents updating the public socket field 80 of the registration table 60 and resetting the NAT timer value.

Figure 29:
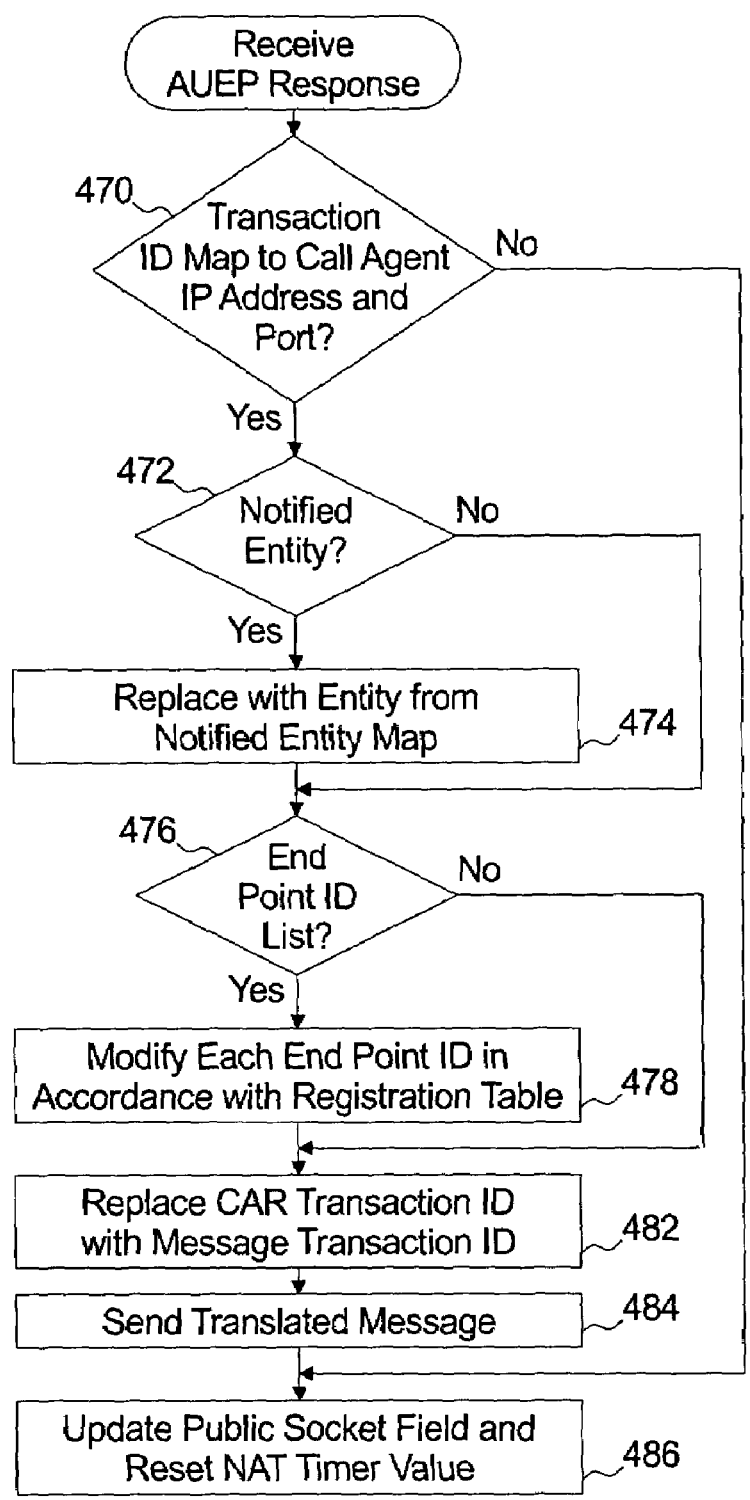
FIG. 29 is a flow chart representing exemplary operation of a firewall proxy work thread module of the firewall proxy in accordance with one embodiment of the present invention.

The flow chart of FIG. 29 represents exemplary operation of the firewall proxy work thread module 52 upon receipt of a response from an MTA 14 to a translated AUEP message.

Step 470 represents determining whether the transaction ID of the response message maps to a call agent IP and port number in the proxy call agent request map 70 (FIG. 13). If not, the response is a response to an AUDP message generated by the proxy server 20 solely to keep the UDP channel through the NAT firewall 18 open.

If the transaction ID does map to a call agent IP and port number, step 472 represents determining whether a notified entity parameter exists in the response message. If yes, the notified entity parameter is replaces with the entity corresponding thereto in the notified entity map 62 (FIG. 9) at step 474. If a notified entity parameter does not exist, step 474 is skipped.

Step 476 represents determining whether the AUEP response includes an endpoint ID list—as it would if it supported multiple endpoints. If yes, the domain name portion of each endpoint within the list is replaced with the IP address used by the firewall proxy 20 in communicating with the call agent at step 478. If the message does not include an endpoint ID list, step 478 is skipped.

Step 482 represents looking up the transaction ID which corresponds to the CAR transaction ID in the proxy call agent request map 70 and replacing the CAR transaction ID in the response message with the transaction ID.

Step 484 represents sending the translated response message to the call agent and step 486 represents updating the public socket field 80 of the registration table 60 and resetting the NAT timer value.

In summary, it should be appreciated that the systems and methods provided enable media session signaling and media transfer between two clients even when one or more of the two clients have a private network IP address and are supported by a NAT firewall. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A media gateway control protocol (MGCP) proxy server for interfacing a plurality of MGCP gateways with a plurality of MGCP call agents independent of whether each of the gateways is served by a network address translation server, the proxy server comprising:
    a network interface with an assigned internet protocol (IP) address for exchanging MGCP messages over an IP compliant network;
    a notified entity map associating each of the plurality of gateways with a one of the plurality of call agents which supports the gateway;
    a registration map associating each of the plurality of gateways with a public socket on which an MGCP message was received from the gateway and an indication of a predetermined time window during which the public socket is valid;
    a gateway request map associating, for each of a plurality of MGCP messages translated by the proxy server: i) a unique transaction ID assigned to the MGCP message; and ii) a message transaction ID assigned to the MGCP message by the gateway;
    a translation module for:
        receiving an MGCP message generated by a gateway and addressed to the IP address assigned to the network interface, the MGCP message comprising a message transaction ID assigned by the gateway and an endpoint ID identifying the gateway, the endpoint ID comprising a local endpoint name and a domain;
        generating a unique transaction ID for assignment to the MGCP message;
        creating a translated message by: i) substituting the unique transaction ID in place of the message transaction ID; and ii) substituting an IP address assigned to the network interface in place of the domain of the endpoint ID of the MGCP message;
        providing the translated message to the network interface for sending to the call agent associated with the gateway in the notified entity map; and
        writing each of the unique transaction ID and the message transaction ID to a record of the gateway request map; and
        writing the public socket from which the message was received from the gateway to the record associated with the gateway in the registration map and updating the indication of the predetermined time window to a time period following receipt of the MGCP message.

2. The MGCP proxy server of claim 1, wherein the translation module further provides for:
    receiving an MGCP response to the translated message, the MGCP response: i) being generated by the call agent and addressed to the IP address assigned to the network interface; and ii) comprising the unique transaction ID;
    reverse translating an MGCP response to create a translated response by obtaining the message transaction ID associated with the unique transaction ID in the gateway request map and substituting the message transaction ID in place of the unique transaction ID in the MGCP response; and
    providing the translated response to the gateway by addressing the translated response to the public socket associated with the gateway in the registration map.

3. The MGCP proxy server of claim 1, wherein the translation module further provides for:
    monitoring the indication of the predetermined time period during which the public socket is valid;
    sending an MGCP message to the gateway by addressing the MGCP message to the public socket during the predetermined time period;
    receiving a response message from the gateway; and
    writing the public socket from which the response message was received to the registration table and resetting the indication of the predetermined time window to a time period following receipt of the response message.

4. A media gateway control protocol (MGCP) proxy server for interfacing a plurality of MGCP gateways with a plurality of MGCP call agents independent of whether each of the gateways is served by a network address translation server, the proxy server comprising:
    a network interface with an assigned internet protocol (IP) address for exchanging MGCP messages over an IP compliant network;
    a registration map associating each of the plurality of gateways with an endpoint ID identifying the gateway, a public socket on which an MGCP message was received from the gateway, and an indication of a predetermined time window during which the public socket is valid, the endpoint ID comprising a local endpoint name and a domain of the gateway;
    a call agent request map associating, for each of a plurality of MGCP messages received from a call agent and translated by the proxy server: i) a unique transaction ID assigned to the MGCP message; and ii) a message transaction ID assigned to the MGCP message by the call agent;
    a translation module for:
        receiving a MGCP message from a call agent, the MGCP message including a messaoe transaction ID and an endpoint ID comprising a local endpoint name uniquely associated with a gateway and the IP address assigned to the network interface;
        generating a unique transaction ID for assignment to the MGCP message;
        creating a translated message by: i) substituting, in place of the message transaction ID of the MGCP message, the unique transaction ID; and ii) substituting, in place of the IP address assigned to the network interface of the endpoint ID of the MGCP message, the domain of the endpoint ID associated with the gateway;
        providing the translated message to the network interface for addressing the translated message to the public socket which is associated with the gateway in the registration table; and
        writing each of the unique transaction ID and the message transaction ID to a record of the call agent request map.

5. The MGCP proxy server of claim 4, wherein the translation module further provides for:
   receiving an MGCP response to the translated message, the MGCP response: i) being generated by the gateway and addressed to the IP address assigned to the network interface; and ii) comprising the unique transaction ID;
   reverse translating an MGCP response to generate a translated response by obtaining the message transaction ID associated with the unique transaction ID in the call agent request map and substituting the message transaction ID in place of the unique transaction ID in the MGCP response;
   providing the translated response to the call agent; and
   writing the public socket from which the MGCP response was received from the gateway to the record associated with the gateway in the registration map and updating the indication of the predetermined time window to a time period following receipt of the MGCP response.

6. The MGCP proxy server of claim 4, wherein the translation module further provides for:
   monitoring the indication of the predetermined time period during which the public socket is valid;
   sending an MGCP message to the gateway by addressing the MGCP message to the public socket during the predetermined time period;
   receiving a response message from the gateway, and
   writing the public socket from which the response message was received to the registration table and resetting the indication of the predetermined time window to a time period following receipt of the response message.

7. A media gateway control protocol (MGCP) proxy server for interfacing a plurality of MGCP gateways with at an MGCP call agent coupled to a private network and assigned a private network Internet protocol (IP) address un-routable on the Internet, the proxy server comprising:
   a public network interface coupled to the Internet and assigned a public network IP address for exchanging MGCP messages over the Internet;
   a private network interface coupled to the private network and assigned a private network IP address for exchanging MGCP messages with the call agent over the private network;
   a registration map associating each of the plurality of gateways with a public socket on which an MGCP message was received from the gateway and an indication of a predetermined time window during which the public socket is valid;
   a gateway request map associating, for each of a plurality of MGCP messages translated by the proxy server: i) a unique transaction ID assigned to the MGCP message; and ii) a message transaction ID assigned to the MGCP message by the gateway;
   a translation module for:
      receiving an MGCP message generated by a gateway and addressed to the public IP address assigned to the public network interface, the MGCP message comprising a message transaction ID assigned by the gateway and an endpoint ID identifying the gateway, the endpoint ID comprising a local endpoint name and a domain;
      generating a unique transaction ID for assignment to the MGCP message;
      creating a translated message by: i) substituting the unique transaction ID in place of the message transaction ID; and ii) substituting the private IP address assigned to the private network interface in place of the domain of the endpoint ID of the MGCP message;
      providing the translated message to the private network interface for sending to the call agent; and
      writing each of the unique transaction ID and the message transaction ID to a record of the gateway request map; and
      writing the public socket from which the message was received from the gateway to the record associated with the gateway in the registration map and updating the indication of the predetermined time window to a time period following receipt of the MGCP message.

8. The MGCP proxy server of claim 7, wherein the translation module further provides for:
   receiving an MGCP response to the translated message, the MGCP response: i) being generated by the call agent and addressed to the private IP address assigned to the private network interface; and ii) comprising the unique transaction ID;
   reverse translating an MGCP response to create a translated response by obtaining the message transaction ID associated with the unique transaction ID in the gateway request map and substituting the message transaction ID in place of the unique transaction ID in the MGCP response; and
   providing the translated response to the public network interface for sending to the gateway by addressing the translated response to the public socket associated with the gateway in the registration map.

9. The MGCP proxy server of claim 7, wherein the translation module further provides for:
   monitoring the indication of the predetermined time period during which the public socket is valid;
   sending an MGCP message to the gateway by addressing the MGCP message to the public socket during the predetermined time period;
   receiving a response message from the gateway, and
   writing the public socket from which the response message was received to the registration table and resetting the indication of the predetermined time window to a time period following receipt of the response message.

10. A media gateway control protocol (MGCP) proxy server for interfacing a plurality of MGCP gateways with an MGCP call agent coupled to a private network and assigned a private network Internet Protocol (IP) address un-routable on the Internet, the proxy server comprising:
   a public network interface coupled to the Internet and assigned a public network IP address for exchanging MGCP messages over the Internet;
   a private network interface coupled to the private network and assigned a private network IP address for exchanging MGCP messages with the call agent over the private network;
   a registration map associating each of the plurality of gateways with an endpoint ID identifying the gateway, a public socket on which an MGCP message was received from the gateway, and an indication of a predetermined time window during which the public socket is valid, the endpoint ID comprising a local endpoint name and a domain of the gateway;
   a call agent request map associating, for each of a plurality of MGCP messages received from a call agent and translated by the proxy server: i) a unique transaction ID assigned to the MGCP message; and ii) a message transaction ID assigned to the MGCP message by the call agent;

a translation module for:
receiving a MGCP message from a call agent, the MGCP message including a message transaction ID and an endpoint ID comprising a local endpoint name uniquely associated with a gateway and the private IP address assigned to the private network interface;

generating a unique transaction ID for assignment to the MGCP message;

creating a translated message by: i) substituting, in place of the message transaction ID of the MGCP message, the unique transaction ID; and ii) substituting, in place of the private IP address of the endpoint ID of the MGCP message, the domain of the endpoint ID associated with the gateway;

providing the translated message to the public network interface for addressing the translated message to the public socket which is associated with the gateway in the registration table; and writing each of the unique transaction ID and the message transaction ID to a record of the calf agent request map.

11. The MGCP proxy server of claim 10, wherein the translation module further provides for:
receiving an MGCP response to the translated message, the MGCP response: i) being generated by the gateway and addressed to the public IP address assigned to the network interface; and ii) comprising the unique transaction ID;

reverse translating an MGCP response to generate a translated response by obtaining the message transaction ID associated with the unique transaction ID in the call agent request map and substituting the message transaction ID in place of the unique transaction ID in the MGCP response;

providing the translated response to the private network interface for sending to the call agent; and writing the public socket from which the MGCP response was received from the gateway to the record associated with the gateway in the registration map and updating the indication of the predetermined time window to a time period following receipt of the MGCP response.

12. The MGCP proxy server of claim 10, wherein the translation module further provides for:
monitoring the indication of the predetermined time period during which the public socket is valid;

sending an MGCP message to the gateway by addressing the MGCP message to the public socket during the predetermined time period;

receiving a response message from the gateway; and writing the public socket from which the response message was received to the registration table and resetting the indication of the predetermined time window to a time period following receipt of the response message.

13. A method of operating a media gateway control protocol (MGCP) proxy server for interfacing a plurality of MGCP gateways with an MGCP call agent, the method comprising:
receiving an MGCP message generated by a gateway and addressed to an IP address assigned to a public network interface of the proxy server, the MGCP message comprising a message transaction ID assigned by the gateway and an endpoint ID identifying the gateway, the endpoint ID comprising a local endpoint name and a domain;

generating a unique transaction ID for assignment to the MGCP message;

creating a translated message by: i) substituting the unique transaction ID in place of the message transaction ID; and ii) substituting, in place of the domain of the endpoint ID of the MGCP message, an IP address assigned to network interface through which the proxy server communicates with the call agent;

providing the translated message to the call agent; and writing each of the unique transaction ID and the message transaction ID to a record of a gateway request map; and writing a public socket on which the message was received from the gateway to a record associated with the MGCP gateway in a registration map and updating an indication of a predetermined time window during which the public socket is valid to a time period following receipt of the MGCP message.

14. The method of claim 13, further comprising:
receiving an MGCP response to the translated message, the MGCP response: i) being generated by the call agent and addressed to the IP address assigned to the network interface through which the proxy server communicates with the call agent; and ii) comprising the unique transaction ID;

reverse translating an MGCP response to create a translated response by obtaining the message transaction ID associated with the unique transaction ID in the gateway request map and substituting the message transaction ID in place of the unique transaction ID in the MGCP response; and providing the translated response to the gateway by addressing the translated response to the public socket associated with the gateway in the registration map.

15. The method of claim 13, further comprising:
monitoring the indication of the predetermined time period during which the public socket is valid;

sending an MGCP message to the gateway by addressing the MGCP message to the public socket during the predetermined time period;

receiving a response message from the MGCP gateway; and writing the public socket from which the response message was received to the registration table and resetting the indication of the predetermined time window to a time period following receipt of the response message.

16. The method of claim 13, wherein the network interface through which the proxy server communicates with the call agent is a private network interface, assigned a private network IP address un-routable on the Internet, and coupled to a private network over which the proxy server exchanges MGCP messages with the call agent.

17. The method of claim 16, further comprising:
receiving an MGCP response to the translated message, the MGCP response: i) being generated by the call agent and addressed to the private IP address assigned to the private network interface; and ii) comprising the unique transaction ID;

reverse translating an MGCP response to create a translated response by obtaining the message transaction ID associated with the unique transaction ID in the gateway request map and substituting the message transaction ID in place of the unique transaction ID in the MGCP response; and providing the translated response to the gateway by addressing the translated response to the public socket associated with the gateway in the registration map.

18. The method of claim 16, further comprising:

monitoring the indication of the predetermined time period during which the public socket is valid;

sending an MGCP message to the gateway by addressing the MGCP message to the public socket during the predetermined time period;

receiving a response message from the MGCP gateway; and writing the public socket from which the response message was received to the registration table and resetting the indication of the predetermined time window to a time period following receipt of the response message.

* * * * *